(12) United States Patent
Yamamoto

(10) Patent No.: US 6,962,429 B2
(45) Date of Patent: Nov. 8, 2005

(54) BACKLIGHT DEVICE AND LIQUID CRYSTAL DISPLAY

(75) Inventor: Norikazu Yamamoto, Yawata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 159 days.

(21) Appl. No.: 10/620,439

(22) Filed: Jul. 17, 2003

(65) Prior Publication Data

US 2004/0085747 A1    May 6, 2004

(30) Foreign Application Priority Data

Jul. 19, 2002  (JP)  ............................ 2002-210731

(51) Int. Cl.[7] ................................................ F21V 8/00
(52) U.S. Cl. ........................ 362/614; 362/269; 362/561
(58) Field of Search ............................ 362/26, 31, 231, 362/269, 225, 561, 600, 601, 613, 614, 634; 349/63, 65; 313/484, 637, 643

(56) References Cited

U.S. PATENT DOCUMENTS 4,059,916 A * 11/1977 Tachihara et al. ............. 362/31
5,039,207 A *  8/1991 Green .......................... 349/65
5,866,984 A *  2/1999 Doughty et al. ............. 313/643

FOREIGN PATENT DOCUMENTS

| JP | 05-264988    | 10/1993 |
| JP | 05-346570    | 12/1993 |
| JP | 10-333588    | 12/1998 |
| JP | 2000-331520  | 11/2000 |
| JP | 2003-178717  |  6/2003 |

* cited by examiner

Primary Examiner—Y. My Quach-Lee
(74) Attorney, Agent, or Firm—Wenderoth, Lind & Ponack, L.L.P.

(57) ABSTRACT

A backlight device has a light guide plate, a rotary member, a rotary drive mechanism for rotating the rotary member, a plurality of mercury-free fluorescent lamps, and a power feed control mechanism. Each of the mercury-free fluorescent lamps has an arc tube mounted on the rotary member so as to extend parallel to the rotary shaft, a mercury-free discharge medium consisting of a rare gas sealed within the arc tube, and first and second electrodes for exciting the discharge medium. The mercury-free fluorescent lamps respectively emit lights of different colors. The emitted light enters the light guide plate through its light incident face and emerges from its light emission face.

16 Claims, 22 Drawing Sheets

AMBIENT TEMPERATURE

TIME

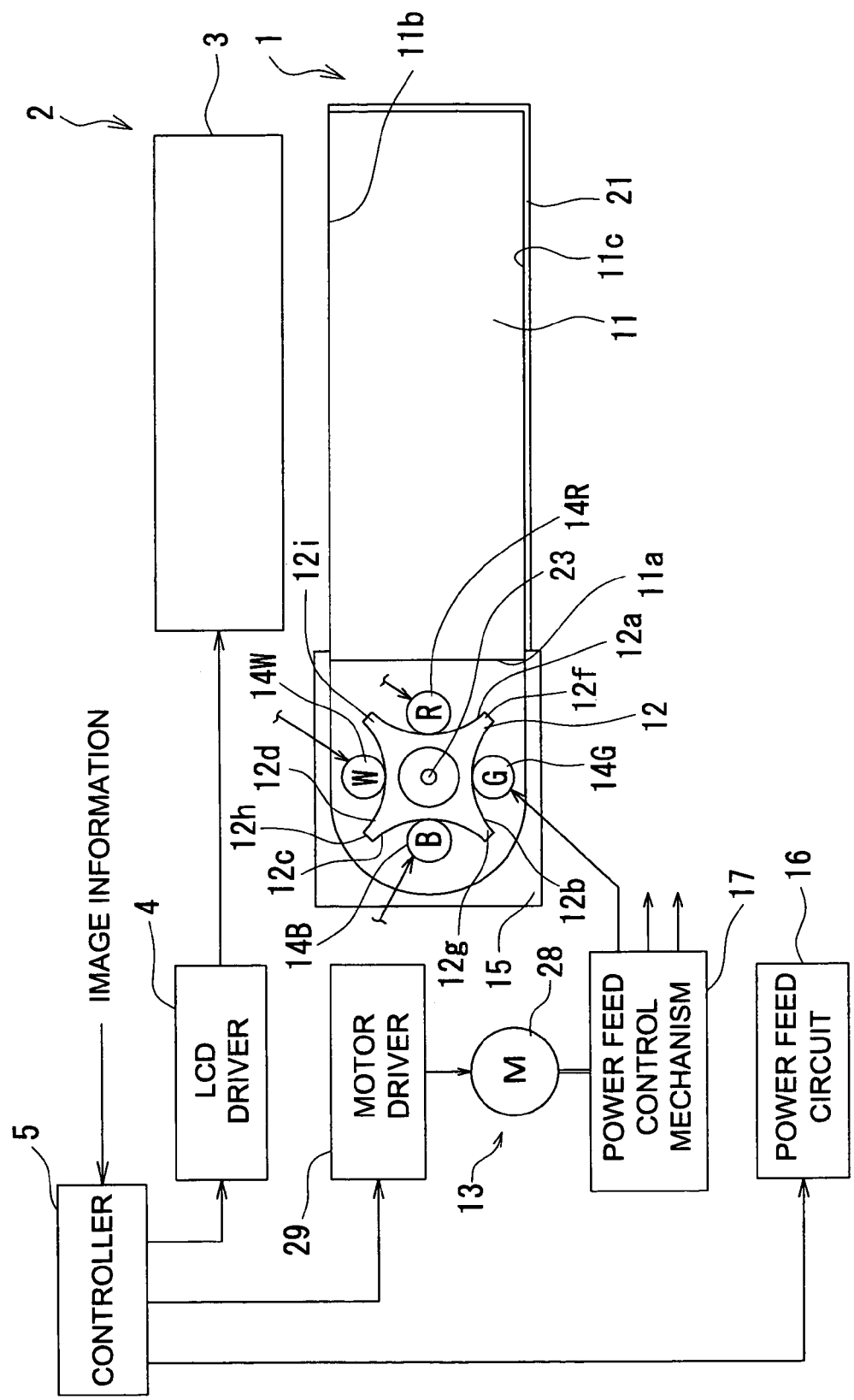

BACKLIGHT DEVICE AND LIQUID CRYSTAL DISPLAY

RELATED APPLICATION

This application claims priority from Japanese Patent Application No. 2002-210731, the entire content of which is incorporated herein by reference.

BACKGROUND OF THE INVENTION

The present invention relates to a backlight device or a lighting device, and more particularly to a backlight device used in a field sequential display apparatus including a liquid crystal display apparatus.

Some conventional color liquid crystal displays are equipped with color filters arranged on a liquid crystal display panel. This type of color liquid crystal display needs to use at least thee pixels or cells on the liquid crystal display panel corresponding to red (R), green (G), and blue (B) as a group for produce of a color image, thereby causing difficulty in achieving a high resolution. Further, since the color filters need to be positioned highly precisely with respect to the liquid crystal display panel, the complexity of fabrication increases. Furthermore, high brightness cannot be obtained due to absorption of light by the color filters.

Besides the color filter type, a time division driving or field sequential type color liquid crystal display is known. The field sequential color liquid crystal display apparatus comprises a liquid crystal display panel and a backlight device having a plurality of colored light sources, such as red, green, and blue light sources. In this type of color liquid crystal display, the light to be projected from the backlight device onto the liquid crystal display panel is switched from one color to another synchronously with the high-speed shuttering of the liquid crystal display panel, and a color image can thus be obtained by the persistence of human vision. Since the color filter is not needed, the field sequential type color liquid crystal display can theoretically achieve three times as high resolution as the color filter type liquid crystal display apparatus.

For example, Japanese Patent Application Laid-open Publication No. 5-264,988 discloses a field sequential color liquid crystal display apparatus equipped with a backlight device comprising a plurality of fixed-type colored light sources. In this color liquid crystal display apparatus, the light to be projected from the backlight device onto the liquid crystal display panel is switched from one color to another by sequentially activating the plurality of light sources. On the other hand, Japanese Patent Application Laid-open Publication No. 2000-331,520 discloses a field sequential color liquid crystal display apparatus in which the backlight device comprises a plurality of colored light sources mounted on a rotary member. In this color liquid crystal display apparatus, the light to be projected from the backlight device onto the liquid crystal display panel is switched from one color to another by rotating the rotary member. In the backlight devices of the conventional field sequential color liquid crystal display apparatus, it is generally intended to adopt mercury fluorescent lamps, each comprising an arc tube containing a mercury-containing discharge medium as the light sources.

However, using mercury fluorescent lamps in field sequential color liquid crystal display apparatuses involves the following problems. First, as schematically shown by a broken line in FIG. 8, the light power of the mercury fluorescent lamp strongly depends on ambient temperature. Thus, neither of the above conventional backlight devices can illuminate the liquid crystal display panel with stable intensity. In particular, in the case of the backlight device of the Japanese Patent Application Laid-open Publication No. 2000-331520, the ambient temperature of each mercury-type fluorescent lamp varies widely due to the heat exchange with the surrounding air as the rotary member rotates, causing unstable light power of the mercury-type fluorescent lamp. This is because the mercury vapor pressure changes with changes in ambient temperature. Second, as schematically shown by a dashed line in FIG. 9, the light power of the mercury-type fluorescent lamp needs a certain amount of time to reach a desired level after starting power distribution to electrodes. The amount of time required is, for example, about 60 seconds. Accordingly, when mercury type fluorescent lamps are adopted in the backlight device of the Japanese Patent Application Laid-open Publication No. 5-264,988, sufficient brightness cannot be obtained when the light to be projected from the backlight device onto the liquid crystal display panel is switched from one color to another at high speed. On the other hand, when mercury type fluorescent lamps are used in the backlight device of the Japanese Patent Application Laid-open Publication No. 2000-331520, the mercury-type fluorescent lamps should be kept on continuously, thereby increasing the power consumption of the backlight device.

Therefore, an object of the present invention to provide a backlight device that can illuminate a field sequential type passive display apparatus, including a liquid crystal display apparatus, with stable brightness while reducing power consumption.

SUMMARY OF THE INVENTION

A first aspect of the invention provides a backlight device comprising: a light guide plate having a light incident face and a light emission face; a rotary member adapted to be rotated along a rotary shaft thereof and disposed opposite to the light incident face of the light guide plate; a rotary drive mechanism for rotating the rotary member; a plurality of mercury-free fluorescent lamps, each comprising an arc tube mounted on the rotary member so as to extend substantially parallel to the rotary shaft, a mercury-free discharge medium consisting essentially of a rare gas sealed within the arc tube, and first and second electrodes for exciting the discharge medium, the mercury-free fluorescent lamps being capable of emitting light of respectively different colors, and the emitted light entering the light guide plate through the light incident face and emerging from the light emission face; and a power feed control mechanism for applying a voltage to the first and second electrodes of each of the mercury-free fluorescent lamps.

Since the backlight device is provided with mercury-free fluorescent lamps the light power thereof is unaffected by ambient temperature, the intensity of the light emerging from the light guide plate is stable. Specifically, rotation of the rotary member causes heat exchange between the arc tube of each mercury-free fluorescent lamps mounted on the rotary member and the surrounding air, resulting in that the ambient temperature of the mercury-free fluorescent lamp varies over a relatively wide range. However, notwithstanding such changes in ambient temperature, the light power of the mercury-free fluorescent lamp is stable. Accordingly, by using the backlight device of the present invention, a field sequential color liquid crystal display apparatus with stable display brightness can be achieved.

Further, the light power of the mercury-free fluorescent lamp reaches the desired level substantially instantaneously after starting energization. As a result, even when the mercury-free fluorescent lamp to be activated is switched from one lamp to another at high speed by rotating the rotary member at high speed, the light emitted from the backlight device has sufficient intensity. Accordingly, when the backlight device of the present invention is applied, since the mercury-free fluorescent lamps need not be kept on continuously but need only be turned on in sequential and intermittent manner, the power consumption can be reduced.

The rare gas includes at least one kind of gas selected from the group consisting of krypton gas, argon gas, helium gas, and xenon gas. The first electrode is arranged within the arc tube. The second electrode comprises a plurality of segmented electrodes arranged on an outer surface of the rotary member so as to be spaced apart from each other in an extending direction of the rotary shaft and contacting with an outer peripheral surface of the arc tube.

More specifically, the backlight device includes a power feed circuit for generating the voltage for exciting the discharge medium. The power feed control mechanism comprises first and second cylindrical members provided at both ends of the rotary member so as to be coaxial with the rotary shaft, a plurality of first contacts provided on a side peripheral surface of the first cylindrical member, each of the first contacts being electrically connected to the first electrode of corresponding one of the mercury-free fluorescent lamps, a second contact provided on a side peripheral surface of the second cylindrical member and electrically connected to the second electrode; a first terminal having one end being abutted to the side peripheral surface of the first cylindrical member and the other end being electrically connected to the power feed circuit, and a second terminal having one end being abutted to the side peripheral surface of the second cylindrical member and the other end being electrically connected to the power feed circuit. The first terminal is contacted with at least one of the plurality of first contacts corresponding to a rotational angular position of the first cylindrical member, while the second terminal is held in contact with the second contact irrespective of a rotational angular position of the second cylindrical member, whereby the voltage is applied to the first and second electrodes of corresponding one of the plurality of mercury-free fluorescent lamps in sequential and intermittent manner to excite the discharge medium.

The power feed control mechanism having the above configuration controls the turning on and off of the plurality of mercury-free fluorescent lamps by switching the contact of the first terminal between the plurality of first contacts according to the rotational angular position of the rotary member changes. In other words, the turning on and off of the mercury-free fluorescent lamps is controlled mechanically, not by an electrical circuit or an electronic circuit, achieving further reduction of the power consumption.

The backlight device may further includes a reflection member disposed on the opposite side of the light incident face with respect to the rotary member and being capable of reflecting the light emitted from each of the mercury-free fluorescent lamps toward the light incident face.

The light guide plate may include a pair of the light incident faces opposite to each other, and the rotary member mounted with the mercury-free fluorescent lamps is disposed opposing to each of the light incident faces.

The light incident face of the light guide plate may be disposed opposite to the light emission face, and the backlight device may comprise a plurality of the rotary members each mounted with the mercury-free fluorescent lamps, the plurality of the rotary members being disposed opposite to the light incident face and parallel to each other.

The arc tube of the mercury-free fluorescent lamp has a straight tube shape extending in parallel to the rotary shaft. Alternatively, the arc tube of the mercury-free fluorescent lamp has a spiral shape, and a center axis of the spiral shape extends in parallel to the rotary shaft.

A second aspect of the invention provides a liquid crystal display apparatus comprising a liquid crystal display panel, and a backlight device mounted facing a rear surface of the liquid crystal display panel, wherein the backlight device comprises, a light guide plate having a light incident face and a light emission face opposite to the rear surface of the liquid crystal display panel, a rotary member adapted to be rotated along a rotary shaft thereof and disposed opposite to the light incident face of the light guide plate, a rotary drive mechanism for rotating the rotary member, a plurality of mercury-free fluorescent lamps, each comprising an arc tube mounted on the rotary member so as to extend substantially parallel to the rotary shaft, a mercury-free discharge medium consisting essentially of a rare gas sealed within the arc tube, and first and second electrodes for exciting the discharge medium, the mercury-free fluorescent lamps being capable of emitting light of respectively different colors, and the emitted light entering the light guide plate through the light incident face and emerging from the light emission face, and a power feed control mechanism for applying a voltage to the first and second electrodes of each of the mercury-free fluorescent lamps.

BRIEF DESCRIPTION OF THE DRAWINGS

Other objects and features of the present invention will become more apparent from the following description of the preferred embodiments with reference to the accompanying drawings in which:

FIG. 21 is a schematic side view showing a liquid crystal display apparatus provided with a backlight device according to a fifth embodiment of the present invention;

DETAILED DESCRIPTION OF THE PREFERRED EMBODIMENTS

First Embodiment

Figure 1:
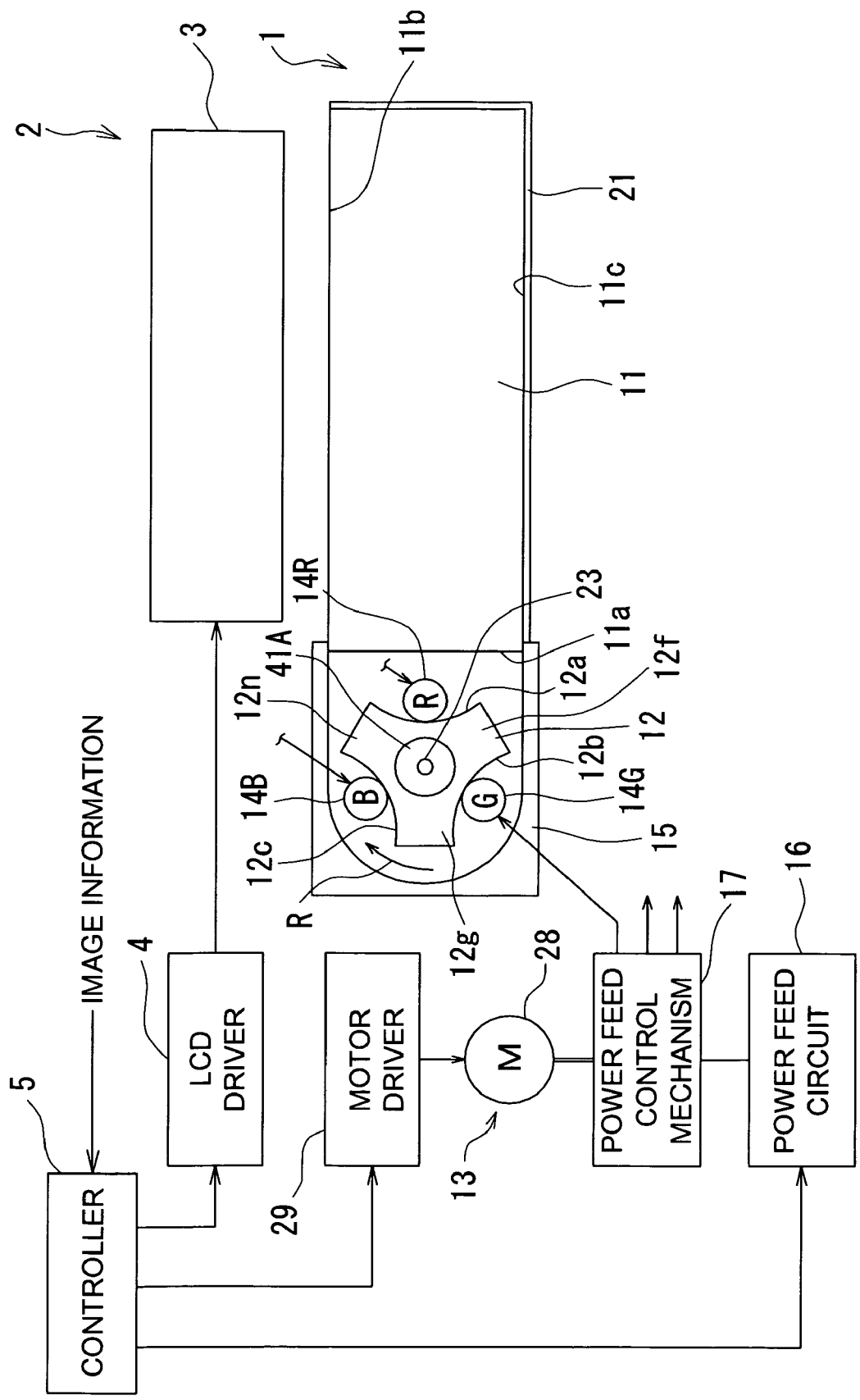
FIG. 1 is a schematic side view showing a liquid crystal display apparatus provided with a backlight device according to a first embodiment of the present invention.

FIG. 1 shows a liquid crystal display apparatus 2 provided with an edge lighting type backlight device 1 according to a first embodiment of the present invention.

The backlight device 1 is mounted behind the rear surface of a liquid crystal display panel 3. The liquid crystal display panel 3 has a known construction where transparent electrodes and a liquid crystal material are sealed between a pair of glass plates. An LCD driver 4 is provided for driving the liquid crystal display panel 3 to perform shuttering. The LCD driver 4 is controlled by a controller 5 in accordance with image information. The construction of the liquid crystal display panel 3 is not limited to any specific type. The present invention can be applied not only to liquid crystal displays but also to other passive displays.

The backlight device 1 comprises a light guide plate 11, a rotary member 12, a rotary drive mechanism 13, three mercury-free fluorescent lamps 14R, 14G, and 14B, a reflection member 15, a power feed circuit 16, and a power feed control mechanism 17.

The light guide plate 11 is generally formed by molding a transparent synthetic resin such as polycarbonate, or epoxy. The light guide plate 11 includes a light incident face 11a through which light enters, a light emission face 11b from which the light exits, and an opposite face 11c which is located on the side opposite to the light emission face 11b. In the present embodiment, one of the four end faces is used as the light incident face 11a. A reflecting film 21 is formed on other faces than the light incident face 11a and light emission face 11b so that the entering light can be efficiently reflected for illumination. The light emitted from each of the mercury-free fluorescent lamps 14R, 14G, and 14B enters the light guide plate 11 at the light incident face 11a, diffuses in the the light guide plate 11, and then emerges as an uniformed light from the light emission face 11b for projection toward the liquid crystal display panel 3.

Figure 2:
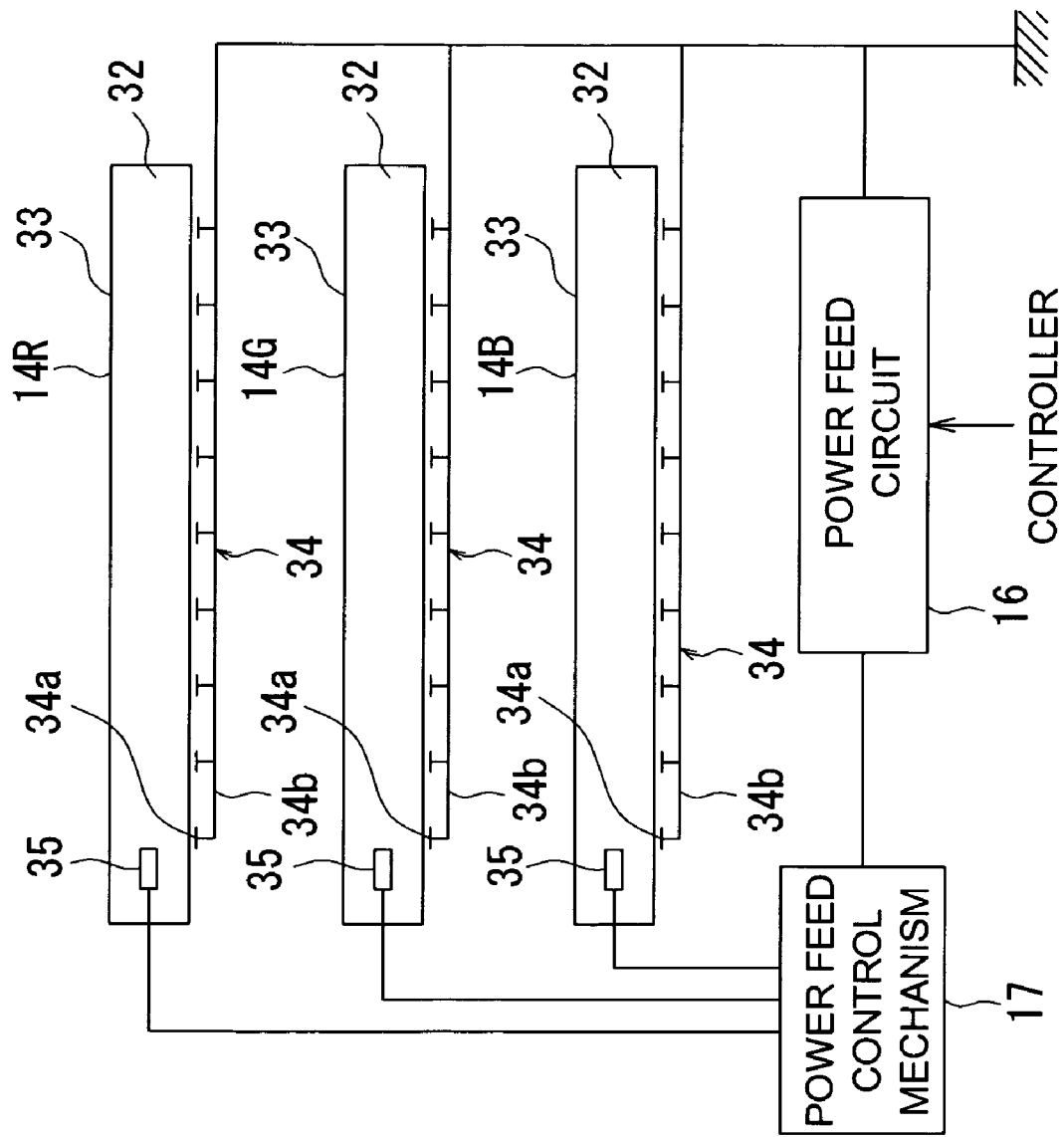
FIG. 2 is a schematic diagram showing the electrical configuration of the liquid crystal display apparatus provided with the backlight device according to the first embodiment of the present invention.
Figure 3:
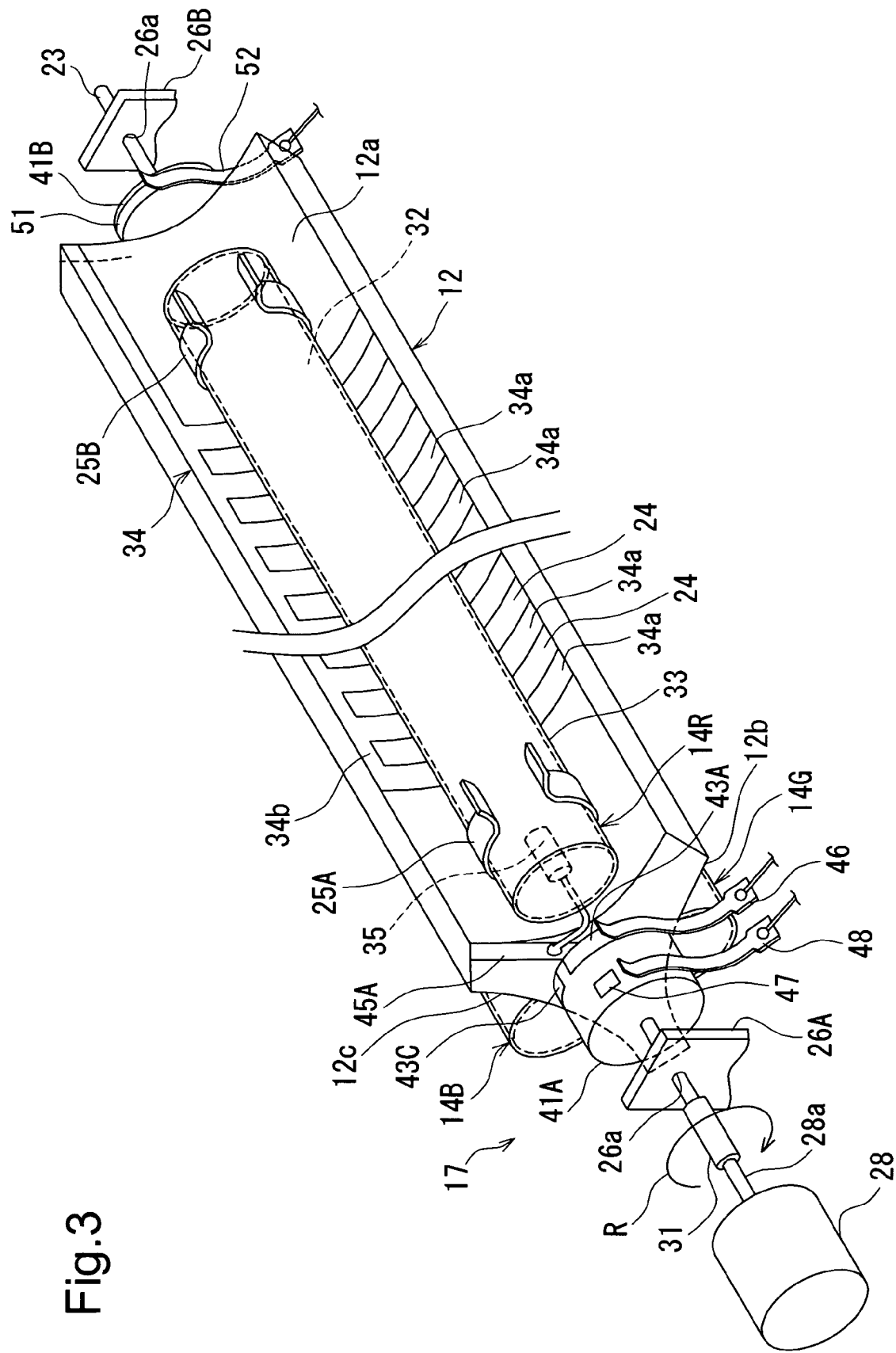
FIG. 3 is a perspective view showing the lighting device according to the first embodiment of the present invention.
Figure 4:
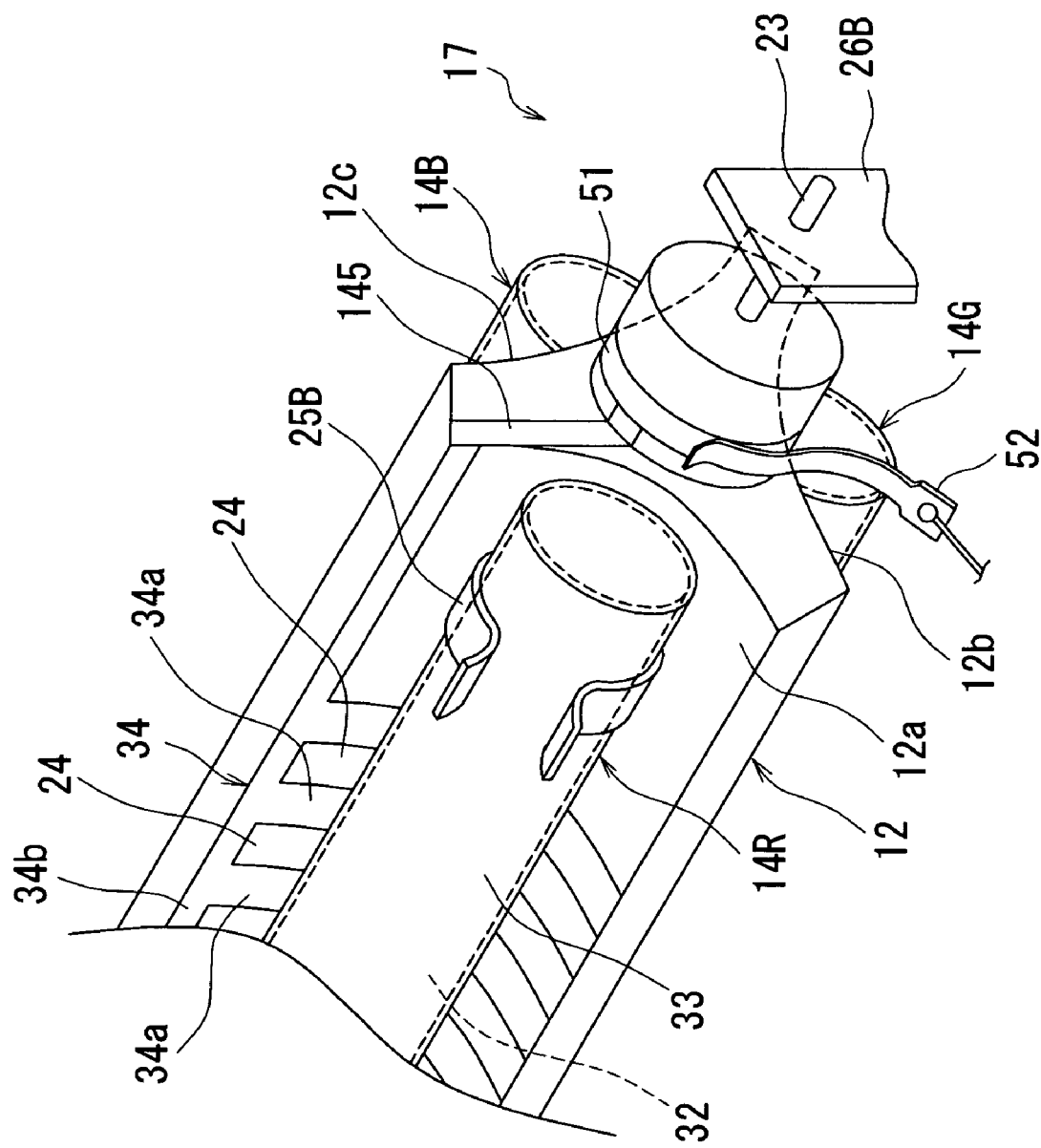
FIG. 4 is a perspective view showing the lighting device according to the first embodiment of the present invention.

Referring further to FIGS. 2 to 4, the rotary member 12 is disposed facing the light incident face 11a of the light guide plate 11. The rotary member 12 is mounted rotatably along a rotary shaft 23 as shown by arrow R. The three mercury-free fluorescent lamps 14R, 14G, and 14B are mounted on the rotary member 12 so as to extend parallel to the rotary shaft 23.

Figure 5:
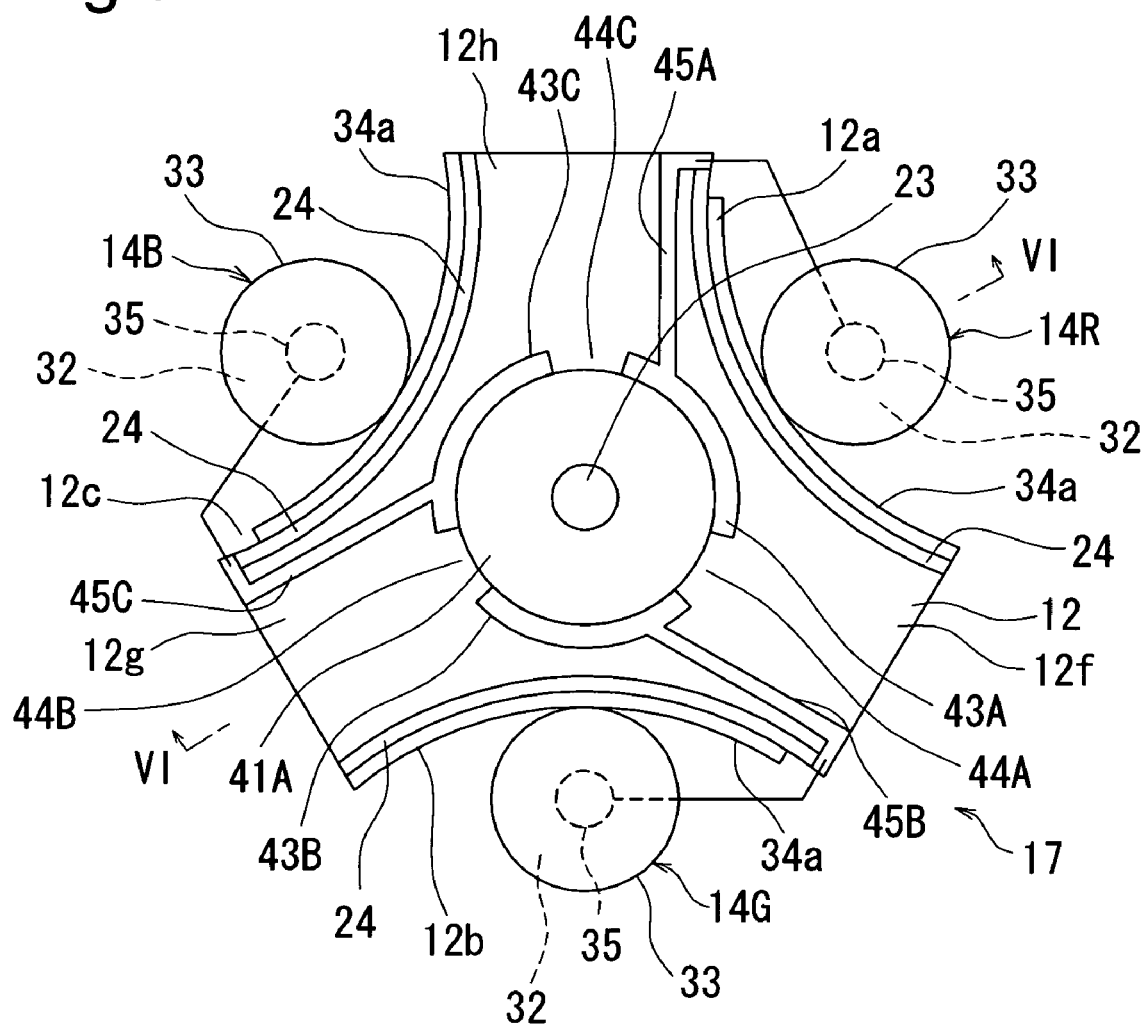
FIG. 5 is a schematic side view showing a rotary member and an arc tube.
Figure 6:
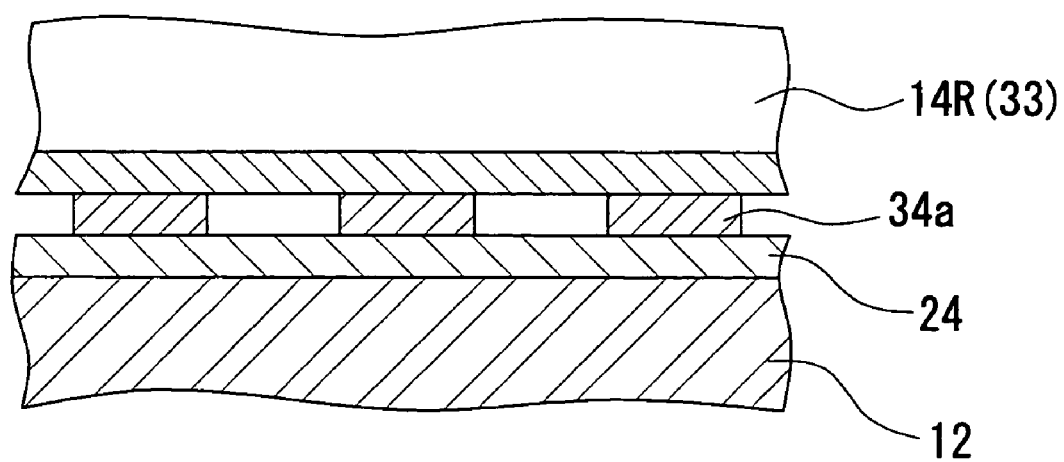
FIG. 6 is a cross sectional view taken along a line VI—VI in FIG. 5.

In the side peripheral surface of the rotary member 12, recessed portions 12a, 12b, and 12c for holding thereon the respective mercury-free fluorescent lamps 14R to 14B are formed so as to extend parallel to the rotary shaft 23. As shown in FIGS. 5 and 6, a layer having preferable insulating and light reflecting characteristics (an insulating reflecting layer 24) is formed on the surface of each of the recessed portions 12a, 12b, and 12c in order to enhance the luminous efficacy. The recessed portions 12a, 12b, and 12c can be formed in an appropriate shape corresponding to the shapes of the mercury-free fluorescent lamps 14R to 14B. They are preferably formed in such a shape that can achieve efficient reflection of the light from the respective mercury-free fluorescent lamps 14R to 14B toward the light incident face 11a according to the shapes of the mercury-free fluorescent lamps 14R to 14B. In particular, when the arc tube 33 of each of the mercury-free fluorescent lamps 14R to 14B has a cylindrical external shape as in the present embodiment, the efficiency of reflection can be enhanced by forming each recessed portion so as to have a curvature matching with the cylindrical shape. The recessed portions 12a to 12c are each provided with metal clamps 25A and 25B for detachably holding both ends of the respective mercury-free fluorescent lamps 14R to 14B.

Light separating portions 12f, 12g, and 12h are formed between the respective recessed portions 12a to 12c of the rotary member 12. These light separating portions 12f, 12g, and 12h have the function of separating the mercury-free fluorescent lamps 14R to 14B from one another for prevention of mixture of the lights emitted from the respective mercury-free fluorescent lamps 14R to 14B. The shape, material, and dimensions of the light separating portions 12f, 12g, and 12h can be chosen appropriately by accounting for factors such as the shape of the arc tube 33 of each of the mercury-free fluorescent lamps 14R to 14B and the shape of the recessed portions 12a to 12c. As shown in FIG. 5, in the present embodiment, the shape of each of the light separating portions 12f to 12h viewing in the extending direction of the rotary shaft 23 is generally a trapezoid having arc-like curved sides.

The rotary shaft 23 of the rotary member 12 is rotatably supported at both ends thereof by support plates 26A and 26B. Specifically, the ends of the rotary shaft 23 are inserted through holes 26a formed in the respective support plates 26A and 26B.

In the present embodiment, the rotary drive mechanism 13 includes a motor 28 such as a stepping motor. The motor 28 is driven by a motor driver 29. The end portion of the rotary shaft 23 projecting through the support plate 26A is connected to the output shaft 28a of the motor 28 by a connecting tube 31 made of an elastic material such as rubber. The rotation of the output shaft 28a of the motor 28 is transmitted to the rotary shaft 23 via the connecting tube 31. The reason that the connecting tube 31 is made of an elastic material is to prevent the rotary shaft 23 from wobbling when the output shaft 28a and the rotary shaft 23 are not properly aligned.

The three mercury-free fluorescent lamps 14R, 14G, and 14B emit red light, green light, and blue light, respectively. Combinations of other colors, such as yellow, magenta, and cyan, can also be employed.

The mercury-free fluorescent lamps 14R to 14B each comprise an arc tube 33 which is a straight tube with a discharge medium 32 sealed therein. The arc tube 33 is formed from a transparent material, examples of which include borosilicate glass, quartz glass, soda glass, and lead glass. The inner surface of the arc tube 33 is coated with a phosphor layer. The composition of the phosphor layer differs according to the color to be emitted. The outer surface of the arc tube 33 may be coated with a dielectric layer such as a multilayer film of a polyester-based resin, a thin film of titanium oxide, or a thin film of silicon oxide. The provision of such a dielectric layer serves to enhance the reflection effect.

The discharge medium 32 consists essentially of a rare gas, and does not contain mercury. The phrase "does not contain mercury" or mercury-free means that an amount of the mercury is small enough so that the rare gas discharge mainly generates the light. At least one kind of gas selected from the group consisting of krypton gas, argon gas, helium gas, and xenon gas can be used as the discharge medium 32. The wavelength of the ultraviolet light emitted from xenon gas is close to that of the ultraviolet light emitted from mercury. Accordingly, when xenon gas is used as the discharge medium 32, a phosphor layer similar in composition to that for a mercury fluorescent lamp can be used.

Each of the mercury-free fluorescent lamps 14R to 14B is provided with an external electrode 34 as a second electrode and an internal electrode 35 as a first electrode in order to excite the discharge medium 32.

The external electrode 34 comprises a plurality of segmented electrodes 34a and a common conductor 34b interconnecting the plurality of segmented electrodes 34a. The segmented electrodes 34a are arranged on each of the recessed portions 12a to 12c so as to be spaced apart from each other in the extending direction of the rotary shaft 23 and contact with the outer peripheral surface of the arc tube 33. The common conductor 34b is formed on each of the recessed portions 12a to 12c so as to extend parallel to the rotary shaft 23. The common conductor 34b is not in contact with the arc tube 33. The segmented electrodes 34a and the common conductor 34b, which together form the external electrode 34, and conducting contacts 43A to 43C, a detection contact 47, and conducting paths 45A to 45C, which will be described later, are each formed from an electrically conductive membrane that can form a thin-film or thin-plate conductive region. For example, a metal powder, including a copper, aluminum, phosphor bronze, or silver powder, or a metal paste containing a resin can be used.

The internal electrode 35 is sealed into one end of the arc tube 33. The internal electrode 35 is formed from an electrically conductive metal such as tungsten or nickel. The surface of the internal electrode 35 may be coated with a metal oxide membrane, such as cesium oxide, magnesium oxide, or barium oxide, and/or a dielectric layer such as a glass layer.

When a voltage is applied from the power feed circuit 16, a discharge occurs between the external electrode 34 and the internal electrode 35, thereby exiting the discharge medium 32. Since the external electrode 34 comprises the plurality of segmented electrodes 34a arranged spaced apart from each other, the discharge occurs between each individual segmented electrode 34a and the single internal electrode 35. Thus, the discharge medium 32 within the arc tube 33 is uniformly excited, resulting in that the arc tube 33 generates an uniform light along its longitudinal direction.

Figure 8:
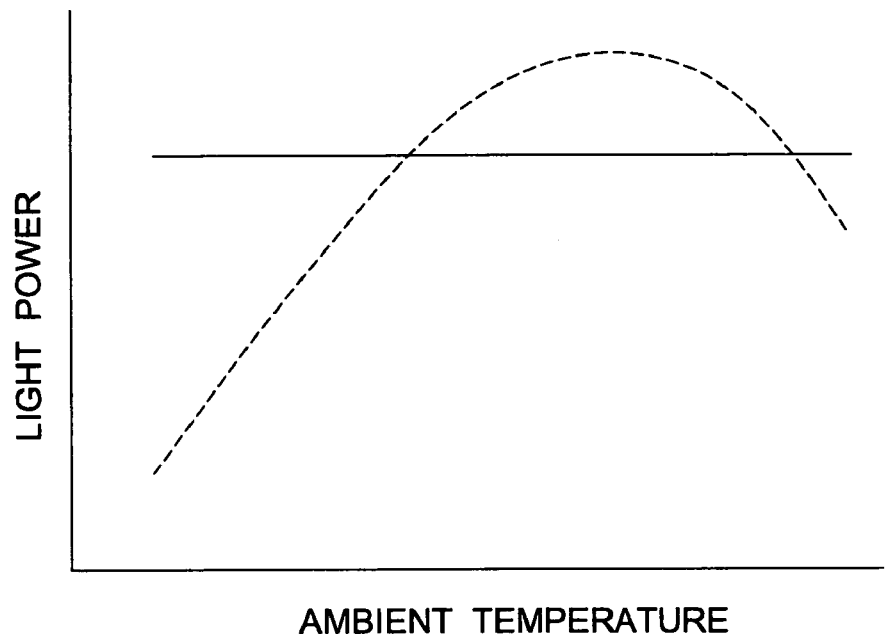
FIG. 8 is a simplified graph showing the relationship between an ambient temperature and a light power of the fluorescent lamp.
Figure 9:
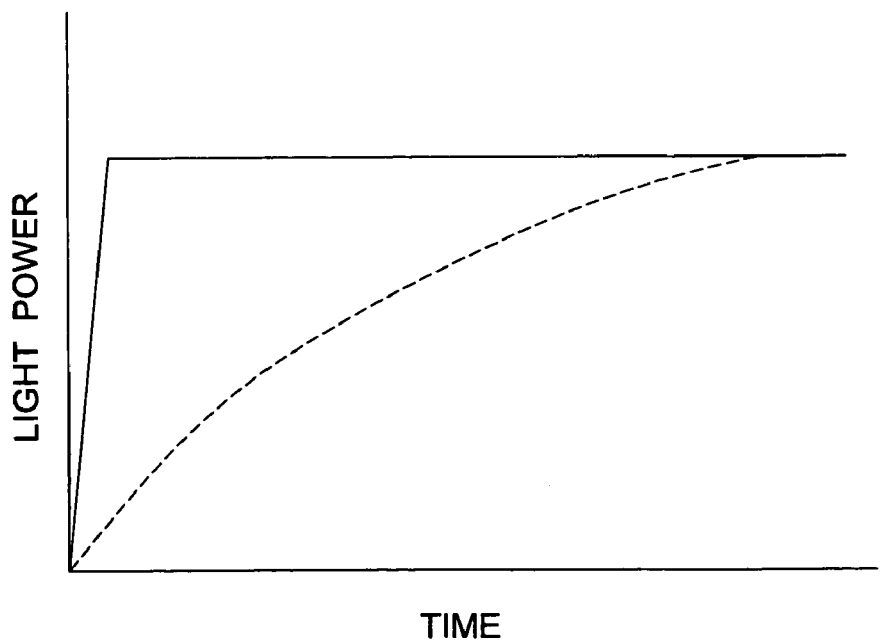
FIG. 9 is a simplified graph showing the relationship between an energization time and the light power of the fluorescent lamp.

Further, since the discharge medium 32 does not contain mercury, the mercury-free fluorescent lamp 14 has the following characteristics. First, as schematically shown by a solid line in FIG. 8, the light power of the mercury-free fluorescent lamp is virtually unaffected by ambient temperature. Second, as schematically shown by a solid line in FIG. 9, the light power of the mercury-free fluorescent lamp reaches the desired level almost instantaneously after initiating energization of the external electrode 34 and the internal electrode 35.

Figure 7:
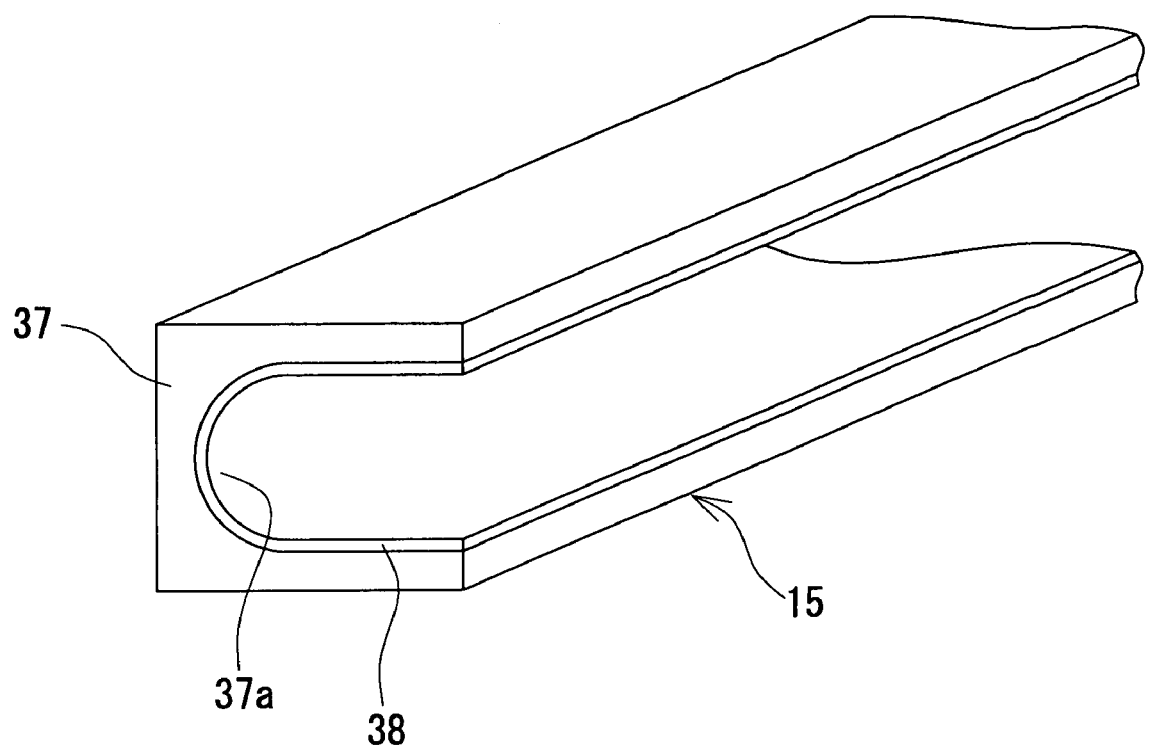
FIG. 7 is a perspective view showing a reflection member.

As shown in FIG. 1, the reflection member 15 is disposed on the opposite side of the light incident face 11a of the light guide plate 11 with respect to the rotary member 12 on which the mercury-free fluorescent lamps 14R to 14B are mounted. Further referring to FIG. 7, the reflection member 15 comprises a frame 37 formed from a rigid material such as a metal or resin. The surface of the frame 37 that faces the light incident face 11a functions as a reflection surface 37a. The reflection surface 37a, when viewed in the extending direction of each of the mercury-free fluorescent lamps 14R to 14B, is curved in the form of an arc. The reflection surface 37a is so shaped that the light emitted from each of the mercury-free fluorescent lamps 14R to 14B is reflected only by the reflection surface 37a, or by the insulating reflecting layer 24 on the rotary member 12 as well as the reflection surface 37a, and collected onto the light incident face 11a. A reflecting film 38 is formed on the reflection surface 37a by treatment such as nickel plating or silver plating.

Then, the power feed circuit 16 and the power feed control mechanism 17 will be described. Referring to FIGS. 1 and 2, the power feed circuit 16 is a circuit that generates a voltage for exciting the discharge medium 32. The power feed circuit 16 is controlled by the controller 5. The voltage generated by the power feed circuit 16 is applied to the internal electrode 35 and external electrode 34 via the power feed control mechanism 17. As will be described in detail later, the power feed control mechanism 17 mechanically switches the respective mercury-free fluorescent lamps 14R to 14B on and off by applying or not applying the voltage to the internal electrode 35 in the respective mercury-free fluorescent lamps 14R to 14B.

Referring to FIGS. 3 to 5, the power feed control mechanism 17 comprises a pair of cylindrical members 41A and 41B mounted at both ends of the rotary member 12 so as to be coaxial with the rotary shaft 23. The cylindrical members 41A and 41B may be formed integrally with the end faces of the rotary member 12, or may be formed as separate pieces and fixed to the respective end faces.

An equal number of conducting contacts to the number of mercury-free fluorescent lamps 14, that is, in this embodiment, three conducting contacts 43A, 43B, and 43C, are provided on the side peripheral surface of the cylindrical member (first cylindrical member) 41A. As shown in FIG. 5, when viewed in the extending direction of the rotary shaft 23, the lengths of the respective conducting contacts 43A, 43B, and 43C measured along the circumference of the cylindrical member 41A are the same. The conducting contacts 43A, 43B, and 43C are separated from each other by spaces 44A, 44B, and 44C whose lengths measured along the circumference of the cylindrical member 41A are also the same. The conducting contacts 43A, 43B, and 43C are connected to their corresponding mercury-free fluorescent lamps 14R to 14B via the respective conducting paths 45A, 45B, and 45C provided on the end face of the rotary member 12. As shown in FIG. 3, a terminal (first terminal) 46 for connecting the conducting contacts 43A to 43C to the power feed circuit 16 is disposed adjacent to the cylindrical member 41A. In this embodiment, the terminal is formed from a material having conductivity and elasticity. The terminal 46 is abutted to the side peripheral surface of cylindrical member 41A at one end, and is connected at the other end to the power feed circuit 16 via a wire. The one end is held constantly in contact with the side peripheral surface of the cylindrical member 41A by the elasticity of the terminal 46. Alternatively, the terminal may be biased toward the cylindrical member by an elastic member such as a spring. Terminals 48 and 52 described hereinafter are identical in shape, size, and material to the terminal 46.

Further, as shown in FIG. 3, a single detection contact 47 for detecting the rotational speed or the number of revolutions of the rotary member 12 is provided on the side peripheral surface of the cylindrical member 41A. The terminal 48 which comes into contact with this detection contact 47 is disposed adjacent to the cylindrical member 41A. The terminal 48 is made at one end to contact the side peripheral surface of the cylindrical member 41A and is connected at the other end to the controller 5 described later. The detection contact 47 is spaced away from the conducting contacts 43A to 43C in the extending direction of the rotary shaft 23 for prevention of interference between the terminals 46 and 48.

As shown in FIG. 4, a single conducting contact 51 is provided on the side peripheral surface of the other cylindrical member (second cylindrical member) 41B. The conducting contact 51 is formed continuously around the entire circumference of the cylindrical member 41B. The common conductor 34b of the external electrode 34 of each of the mercury-free fluorescent lamps 14R to 14B is connected to the conducting contact 51 via a conducting path 145 provided on the end face of the cylindrical member 41B. A terminal (second terminal) 52 for connecting the conducting contact 51 to the power feed circuit 16 is disposed adjacent to the cylindrical member 41B. This terminal 52 is made at one end to constantly contact the conducting contact 51 and is connected at the other end to the power feed circuit 16 via a wire.

When the motor 28 is driven, the rotation of the output shaft 28a is transmitted via the connecting tube 31 to the rotary shaft 23 of the rotary member 12, causing the rotary member 12 to rotate. As the rotary shaft 23 rotates, the cylindrical members 41A and 41B rotate about the rotary shaft 23. As the cylindrical member 41A rotates, the tip of the terminal 46 comes into contact with one of the three conducting contacts 43A to 43C in accordance with the rotational angular position of the cylindrical member 41A. When the terminal 46 comes into contact with one of the conducting contacts 43A to 43C, a voltage is applied from the power feed circuit 16 to the internal electrode 35 of a corresponding one of the mercury-free fluorescent lamps 14R to 14B. When the tip of the terminal 46 is located in any one of the spaces 44A to 44C, voltage is not applied to the internal electrode 35 of any one of the mercury-free fluorescent lamps 14R to 14B. On the other hand, since the conducting contact 51 on the cylindrical member 41B is always or continuously in contact with the terminal 52, the external electrodes 34 of the mercury-free fluorescent lamps 14R to 14B are always connected to the power feed circuit 16. Accordingly, as the rotary member 12 rotates, the three mercury-free fluorescent lamps 14R to 14B are activated to generate light in sequential and intermittent manner corresponding to rotational angular position of the rotary member 12. The conducting contacts 43A to 43C on the cylindrical member 41A and the corresponding terminal 46 are arranged so that, when any one of the mercuryless fluorescent lamps 14R to 14B is positioned opposite the light entrance face 11a of the light guiding plate 11 by the rotation of the rotating member 12, the external electrode 34 of that fluorescent lamp is connected to the power feed circuit 16. Therefore, each of the mercury-free fluorescent lamps 14R to 14B respectively corresponding to red, green, and blue colors is turned on only when it comes to the position opposite the light incident face 11a of the light guide plate 11, and is turned off when it is outside that position. Power consumption can thus be reduced by activating each mercury-free fluorescent lamp only when it needs to emit light toward the liquid crystal display panel 3 through the light guide plate 11, rather than constantly keeping the mercury-free fluorescent lamps 14R to 14B on.

The mercury-free fluorescent lamps 14R to 14B are turned on and off with the respective conducting contacts 43A to 43C coming into and going out of contact with the terminal 46 as the cylindrical member 41A rotates with the rotary member 12. In other words, the turning on and off of the mercury-free fluorescent lamps 14R to 14B is controlled, not by an electrical or electronic circuit, but mechanically by the power feed control mechanism 17. The provision of this power feed control mechanism 17 serves to further reduce the power consumption.

The controller 5 shutters the liquid crystal display panel 3 by controlling the LCD driver 4 based on input image information, and also controls the motor driver 29 to drive the motor 28. Since the mercury-free fluorescent lamps 14R to 14B are sequentially activated for light emission as they are positioned opposite the light incident face 11a of the light guide plate 11 by the rotation of the rotary member 12, the light illuminating the liquid crystal display panel 3 through the light guide plate 11 sequentially changes from red light L (R) to blue light L (B), and then to green light L (G). The controller 5 synchronizes the shutting of the liquid crystal display panel 3 and the switching of the colored light emitted from the backlight device 1, the switching speed being determined by the rotational speed of the rotary member 12. As a result, a red color image, a blue color image, and a green color image are sequentially displayed on the liquid crystal display panel 3, and the resulting image is perceived as a full color image by the human eye because of the persistence of human vision.

In the backlight device 1 of the present embodiment, the rotary member 12 mounted with the fluorescent lamps (mercury-free fluorescent lamps 14R to 14B) is rotated, and each fluorescent lamp is turned on only when it comes to the position opposite to the light guide plate 11. Such arrangement has been achieved by employing the mercury-free fluorescent lamps 14R to 14B as the fluorescent lamps. More specifically, as explained with reference to FIG. 8, since the light power of each of the mercury-free fluorescent lamps 14R to 14B does not depend on ambient temperature, the light power remains stable even when the ambient temperature changes with the rotation of the rotary member 12. Further, as explained with reference to FIG. 9, since the light power of each of the mercury-free fluorescent lamps 14R to 14B reaches the desired level instantaneously after initiating the energization, the light power remains stable even when the fluorescent lamps are repeatedly turned on and off at high speed.

Figure 10:
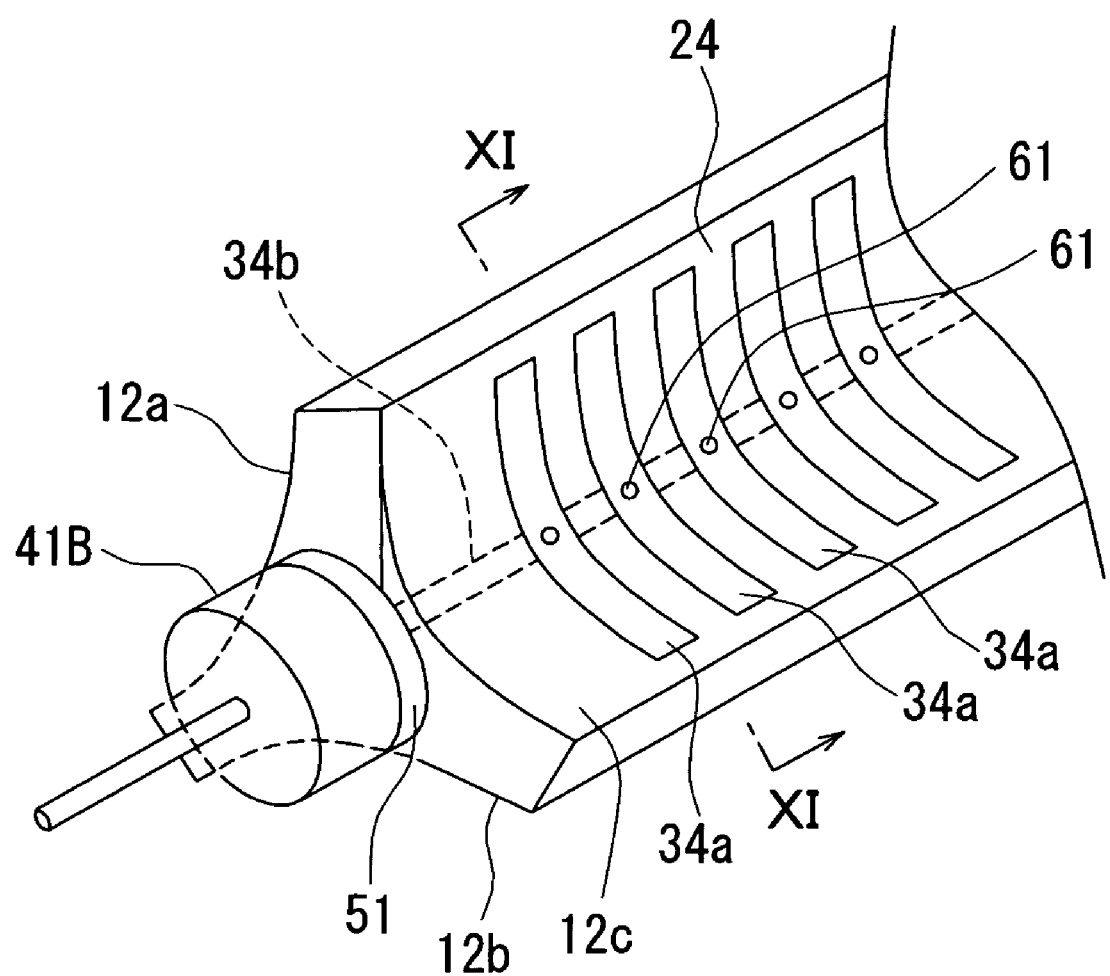
FIG. 10 is a schematic perspective view showing an alternation of an external electrode.
Figure 11:
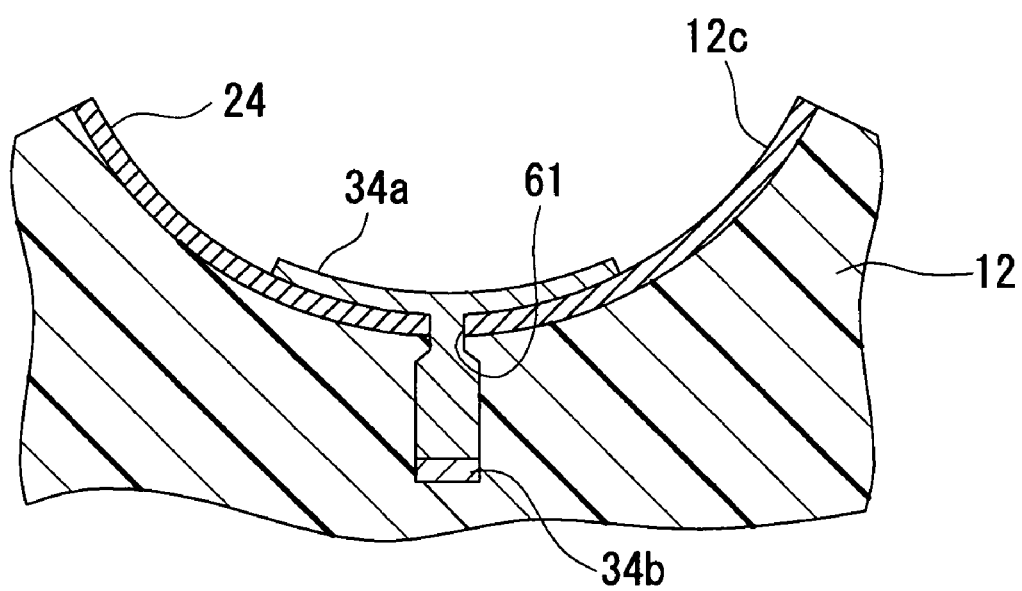
FIG. 11 is a cross sectional view taken along a line XI—XI in FIG. 10.

FIGS. 10 and 11 show an alternative wiring example for the external electrode 34. The common conductor 34b is provided within the rotary member 12, and each segmented electrode 34a is connected to the common conductor 34b by means of a through hole 61.

Figure 12:
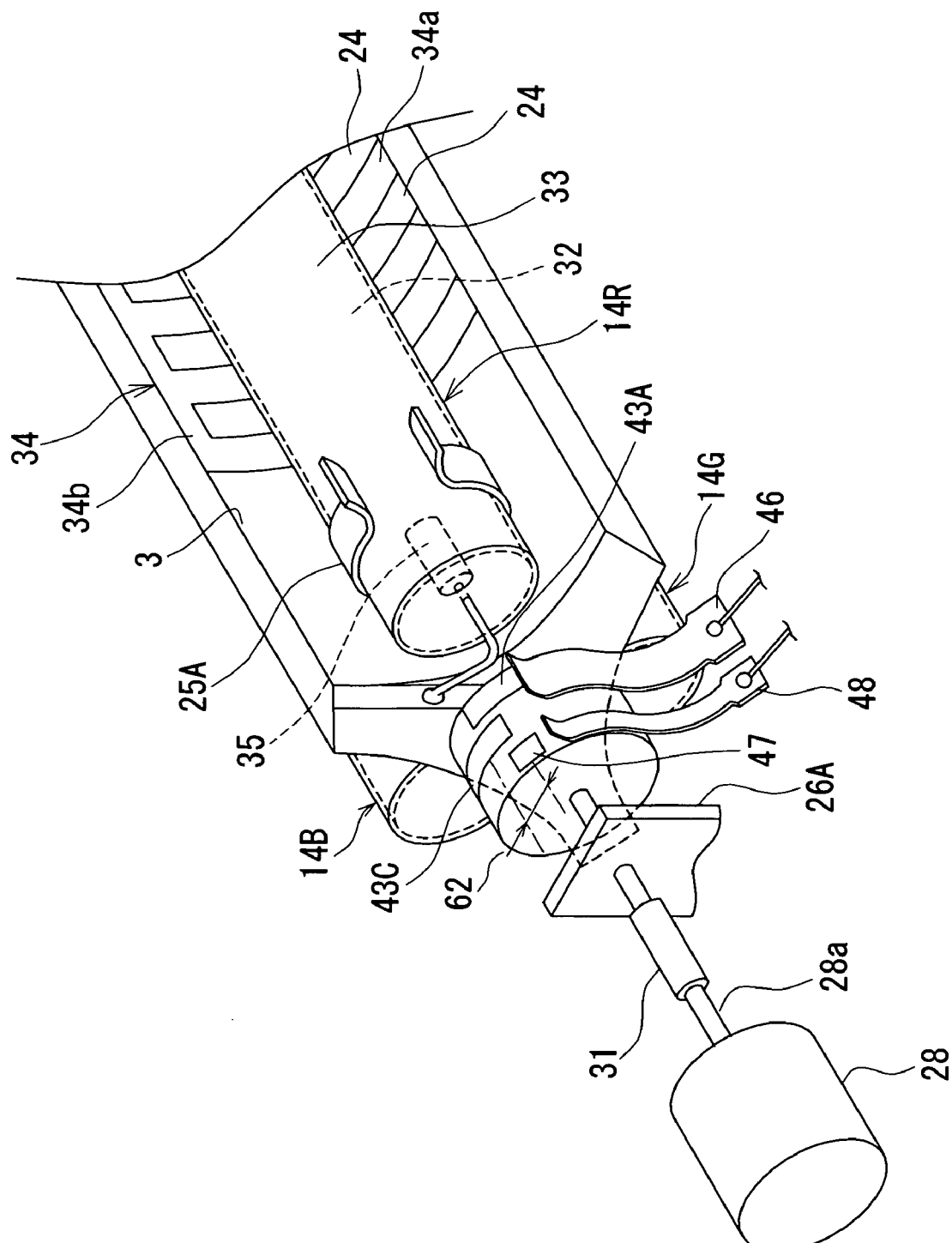
FIG. 12 is a perspective view showing an alternation of a power feed control mechanism.

FIG. 12 shows an alternative example of the power feed control mechanism. The conducting contacts 43A to 43C corresponding to the respective mercury-free fluorescent lamps 14R to 14B are arranged so as to located shifted with each other in the direction of the rotary shaft 23. When viewed in the extending direction of the rotary shaft 23, the conducting contacts 43A to 43C corresponding to the respective mercury-free fluorescent lamps 14R to 14B partially overlap each other. Further, since the conducting contacts 43A to 43C are displaced from each other, the tip of the terminal 46 is made correspondingly wider. In the alternative example of FIG. 12, when the terminal 46 is positioned in the overlapping portion of the adjacent conducting contacts 43A to 43C (the portion indicated at reference numeral 62 in FIG. 12), the corresponding two of the mercury-free fluorescent lamps 14R to 14B are turned on simultaneously.

Figure 13:
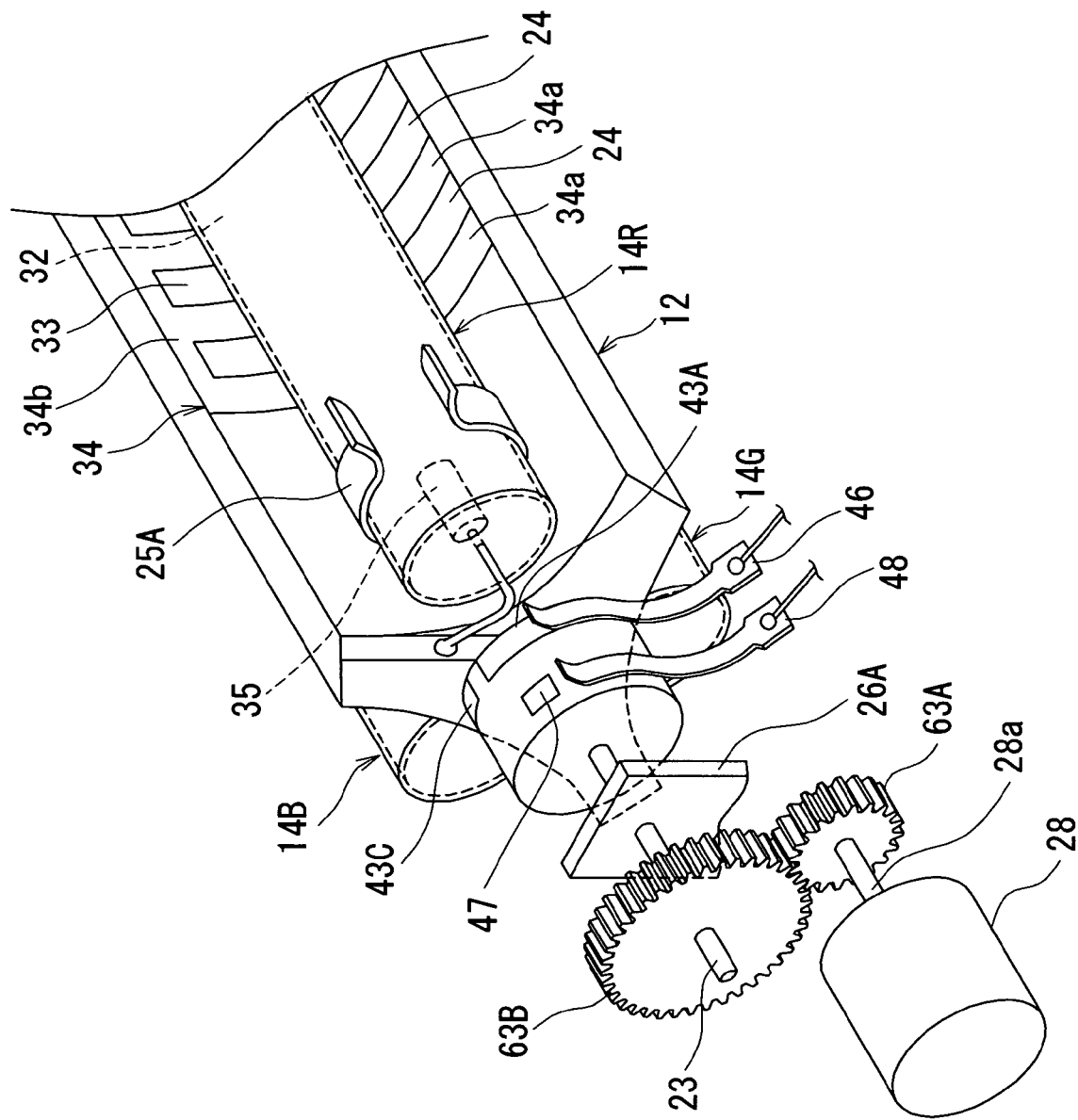
FIG. 13 is a perspective view showing a first alternation of a rotary drive mechanism.
Figure 14:
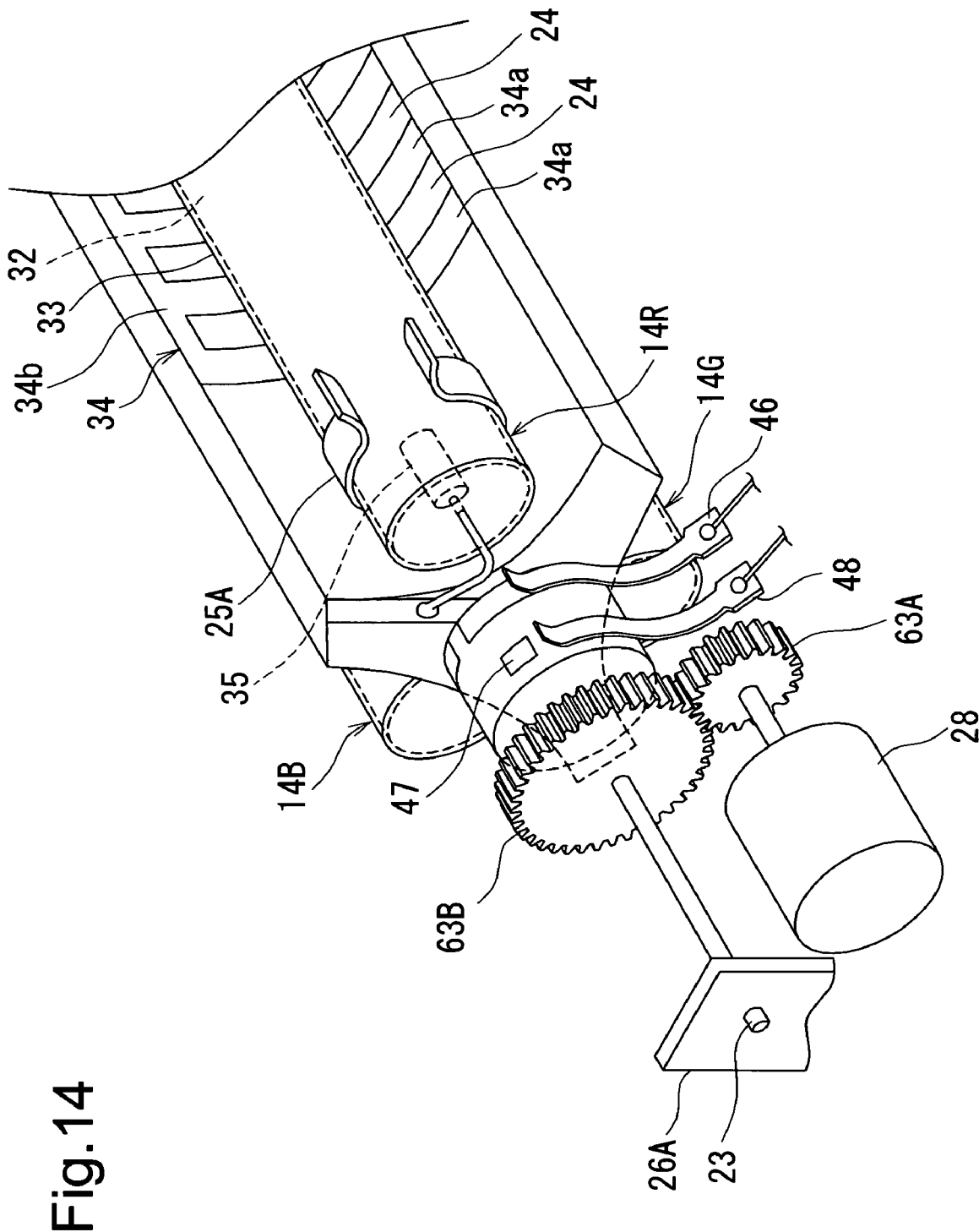
FIG. 14 is a perspective view showing a second alternation of the rotary drive mechanism.

FIGS. 13 and 14 show alternative examples of the rotary drive mechanism 13. In the alternative example of FIG. 13, a spur gear 63A fixed on the output shaft 28a of the motor 28 is engaged with a spur gear 63B fixed on the rotary shaft 23 at a position outward of the support plate 26A, and the rotation of the output shaft 28a of the motor 28 is transmitted to the rotary member 12 by means of the spur gears 63A and 63B. In the alternative example of FIG. 14, the spur gear 63B is fixed on the rotary shaft 23 at a position inward of the support plate 26A.

Figure 15:
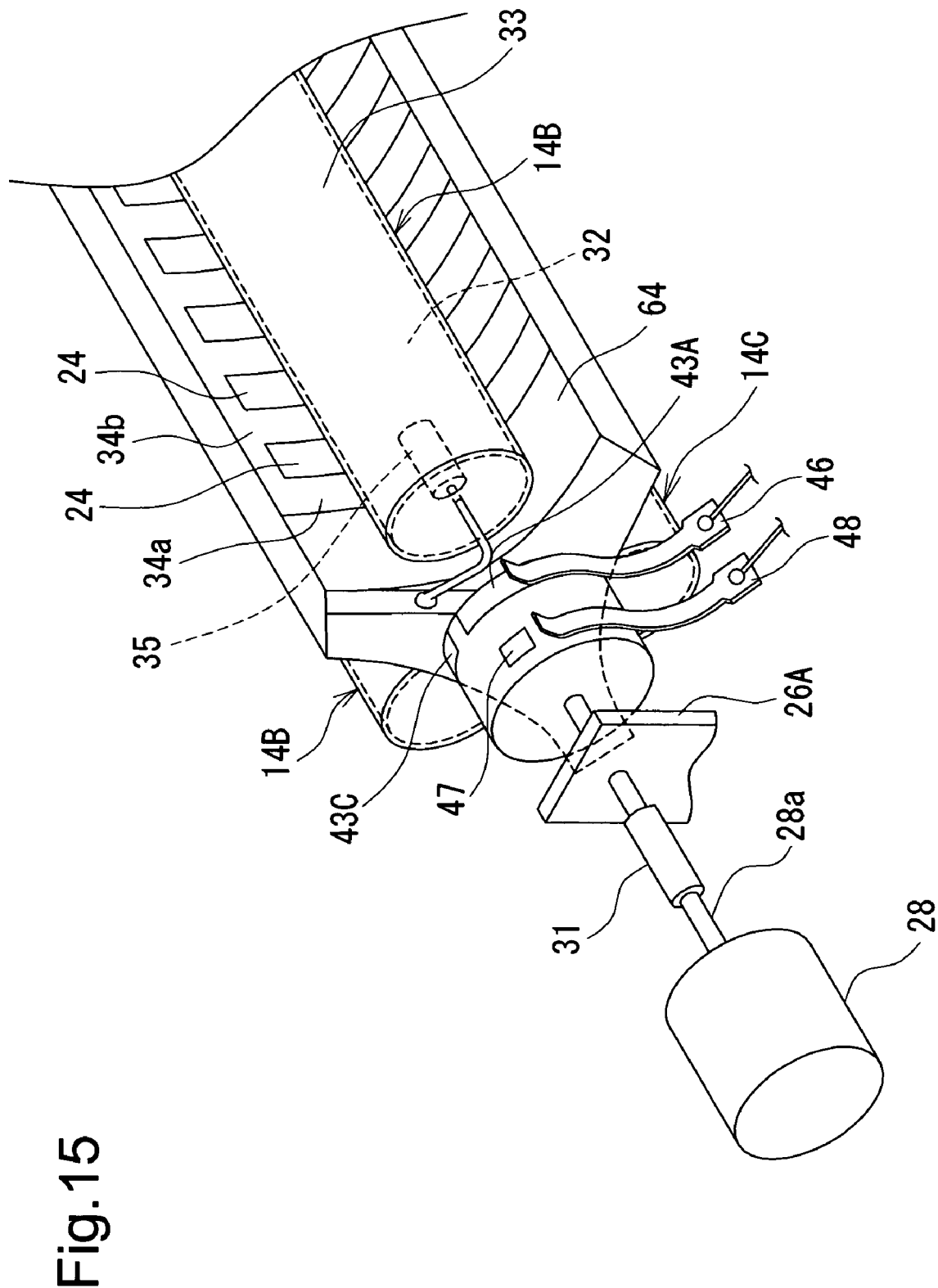
FIG. 15 is a perspective view showing an alternation for mounting the arc tube to the rotary member.

FIG. 15 shows an alternative example of the mount of the arc tube 33 onto the rotary member 12. The rotary member 12 shown here is not provided with the metal clamps 25A and 25B (see FIG. 1). The arc tube 33 is fixed to the rotary member 12 by means of an adhesive 64 applied to portions where the external electrode 34 is not formed on the surface of each of the recessed portions 12a to 12c.

Figure 16:
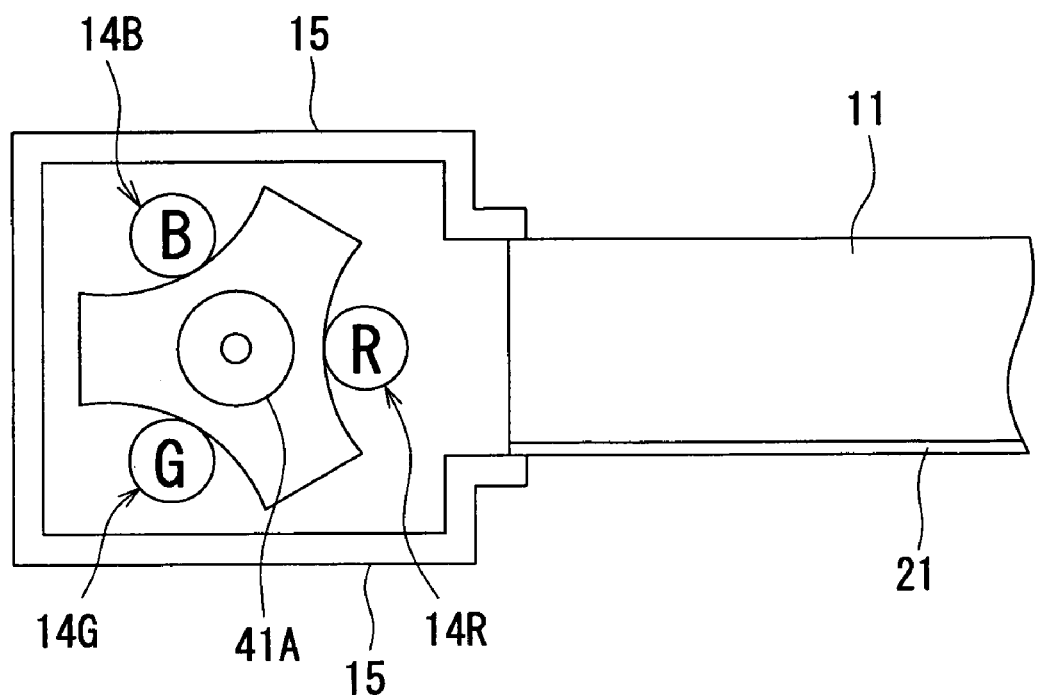
FIG. 16 is a schematic side view showing an alternation of the reflection member.

FIG. 16 shows an alternative example of the reflection member 15. When viewed in the extending direction of the rotary shaft 23, the reflection surface 37a is rectangular in shape.

Second Embodiment

Figure 17:
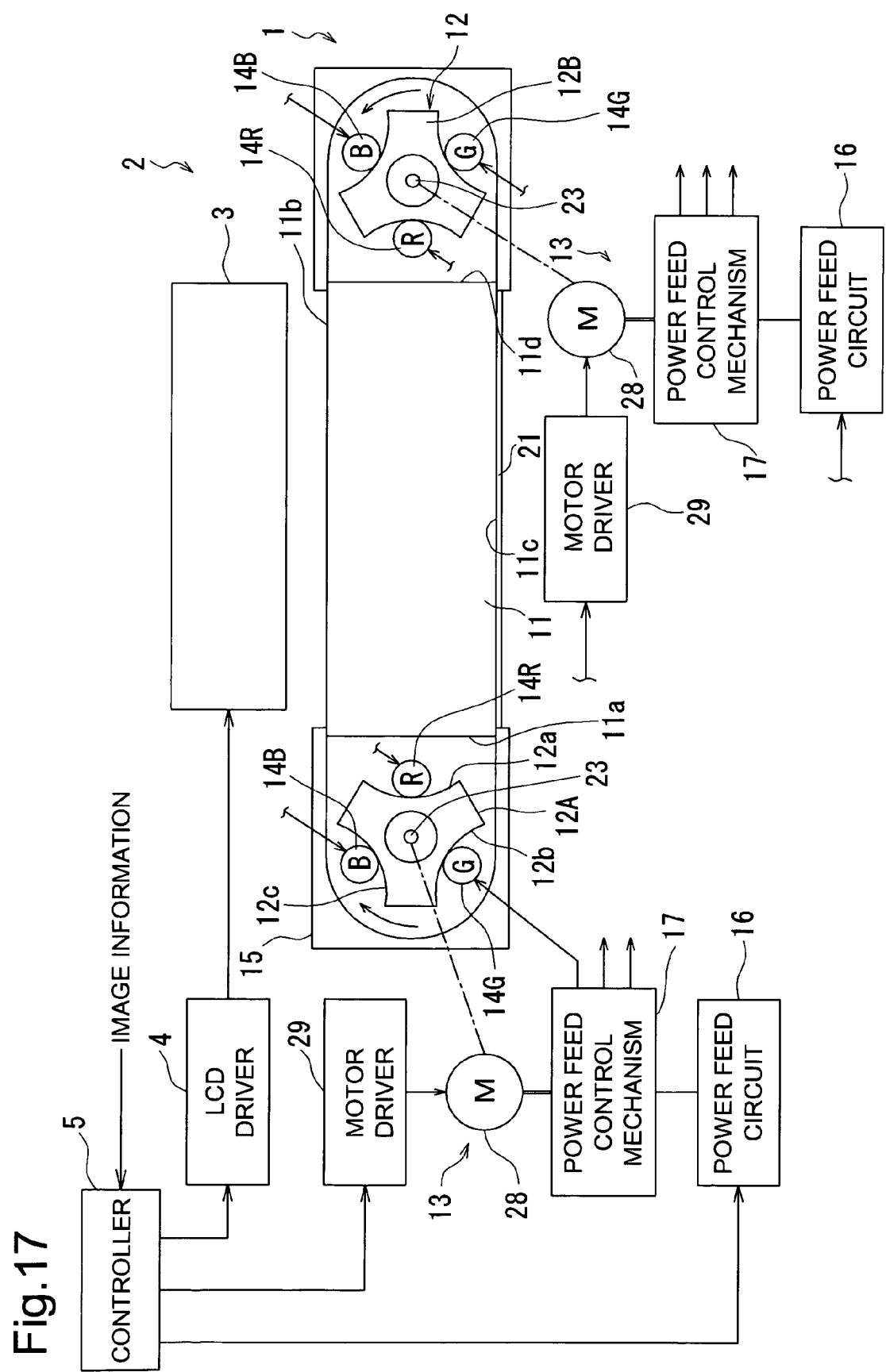
FIG. 17 is a schematic side view showing a liquid crystal display apparatus provided with a backlight device according to a second embodiment of the present invention.

FIG. 17 shows an edge lighting type backlight device 1 according to a second embodiment of the present invention. A pair of opposite edge faces of the light guide plate 11 serve as light incident faces 11a and 11d. The rotary members 12A and 12B, each mounted with mercury-free fluorescent lamps 14R to 14B, are disposed facing the respective light incident faces 11a and 11d. By introducing light through the pair of opposite light incident faces 11a and 11d, evenly spread light can be made to exit from the light emission face 11b even when the area size of the light guide plate 11 is large. The controller 5 synchronizes the rotation of the two rotary members 12A and 12b by controlling their corresponding two motors 28 and 28. Specifically, the two rotary members 12A and 12b are rotated at the same rotational speed. Of the mercury-free fluorescent lamps 14R to 14B on the rotary members 12A and 12B, the lamps emitting light of the same color are simultaneously positioned opposite to the respective light incident faces 11a and 11d. In other respects, the construction and operation of the second embodiment are the same as those of the first embodiment, and the same elements are therefore designated by the same reference numerals and will not be further described here.

Third Embodiment

Figure 18:
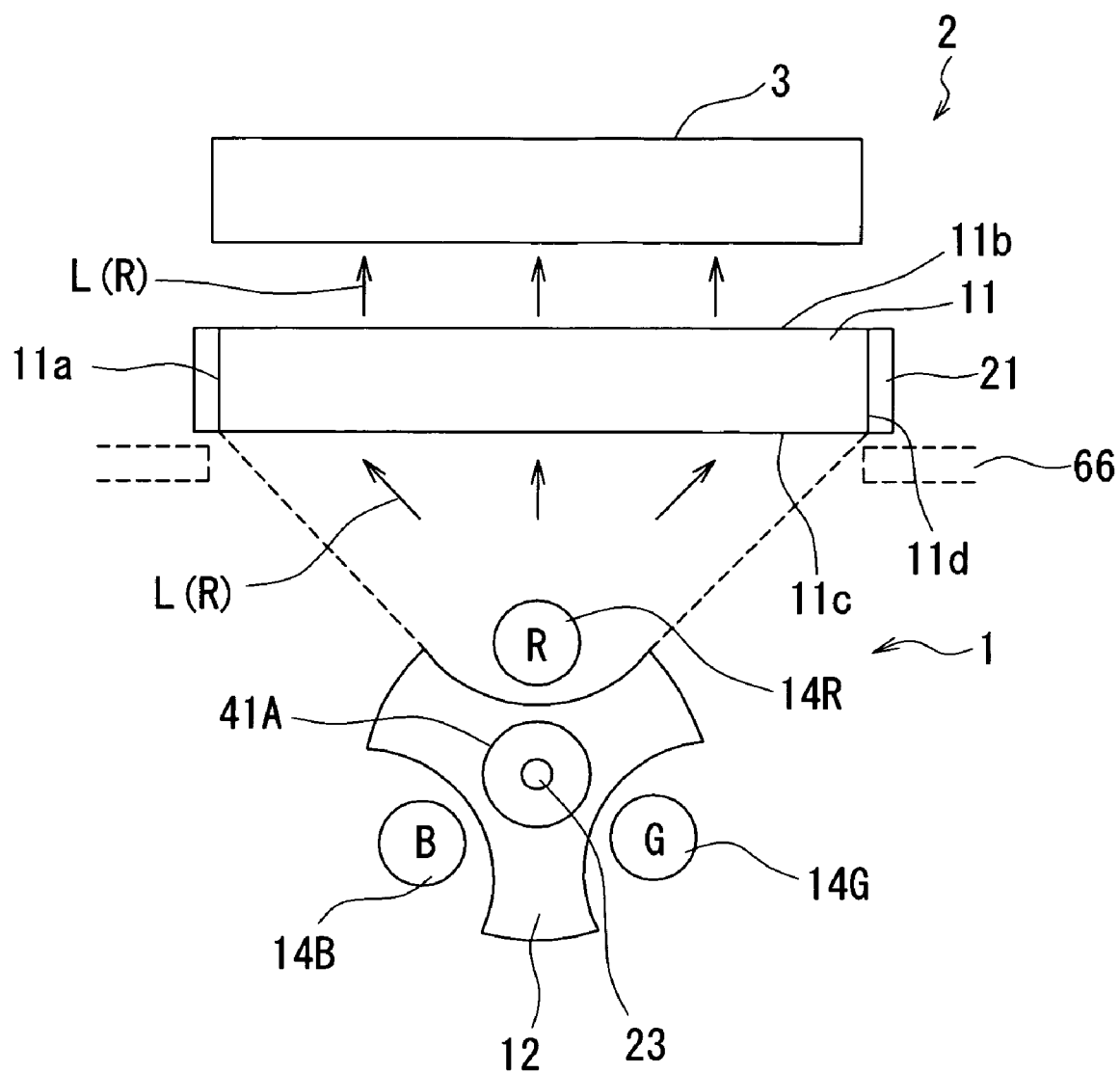
FIG. 18 is a schematic side view showing a liquid crystal display apparatus provided with a backlight device according to a third embodiment of the present invention.

FIG. 18 shows a liquid crystal display apparatus 2 equipped with a rear lighting type backlight device 1 according to a third embodiment of the present invention. The face 11c on the side opposite to the light emission face 11b of the light guide plate 11 functions as the light incident face, and the rotary member 12 with the mercury-free fluorescent lamps 14R to 14B mounted thereon is disposed facing this light incident face 11c. Reflecting films 21 are formed on both edge faces 11a and 11d of the light guide plate 11. Since the opposite face 11c has a larger area than the edge faces 11a and 11d, it is desirable that the recessed portions 12a to 12c of the rotary member 12 is each formed in the shape of an arc having a wider opening than the recessed portions 12a to 12c of the first embodiment (see FIGS. 1 and 2) so that the light emitted from the respective mercury-free fluorescent lamps 14R to 14B efficiently enters the opposite face 11c. In FIG. 18, reference numeral 66 is a limiting plate for limiting the range over which the light from the respective mercury-free fluorescent lamps 14R to 14B spreads. In other respects, the construction of the third embodiment is the same as that of the first embodiment, and the same component elements are therefore designated by the same reference numerals and will not be further described here.

Fourth Embodiment

Figure 19:
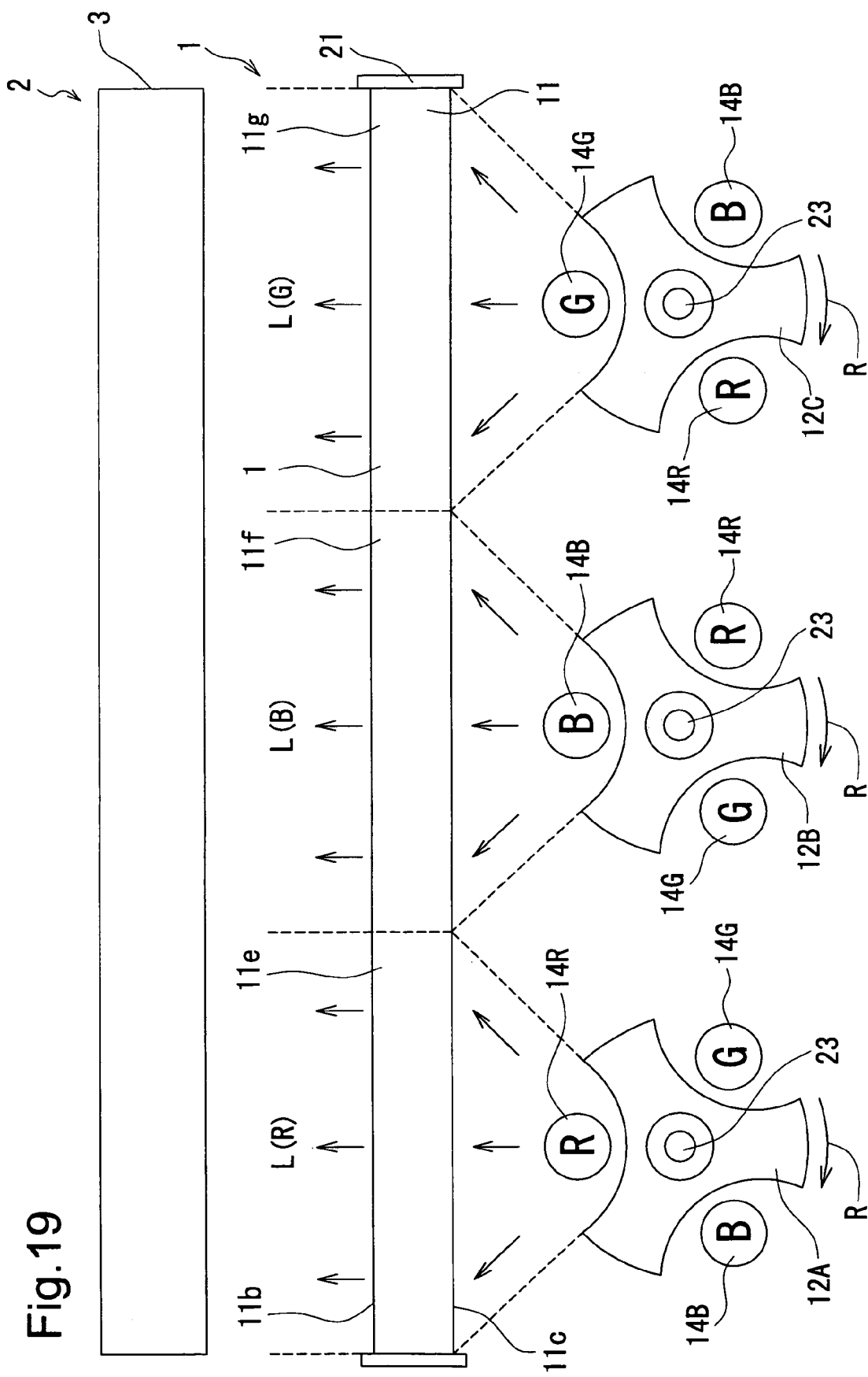
FIG. 19 is a schematic side view showing a liquid crystal display apparatus provided with a backlight device according to a fourth embodiment of the present invention.

FIG. 19 shows a liquid crystal display apparatus 2 provided with a backlight device 1 according to a fourth embodiment of the present invention. The face 11c on the side opposite to the light emission face 11b of the light guide plate 11 forms the light incident face. Three rotary members 12A, 12B, and 12C, each mounted with mercury-free fluorescent lamps 14R to 14B, are disposed facing the light emission face 11b. The rotary members 12A to 12C are arranged so that their rotary shafts 23 extend parallel to each other. With the plurality of rotary members 12A to 12C disposed facing the light incident face 11c, evenly spread light can be made to exit from the light emission face 11b even when the area size of the light guide plate 11 is large. The number of rotary members is set in accordance with the number of mercury-free fluorescent lamps mounted on each rotary member. In the present embodiment, since each of the rotary members 12A to 12C is mounted with three mercury-free fluorescent lamps 14R to 14B, three rotary members 12A to 12C are disposed facing the light guide plate 11.

Figure 20A:
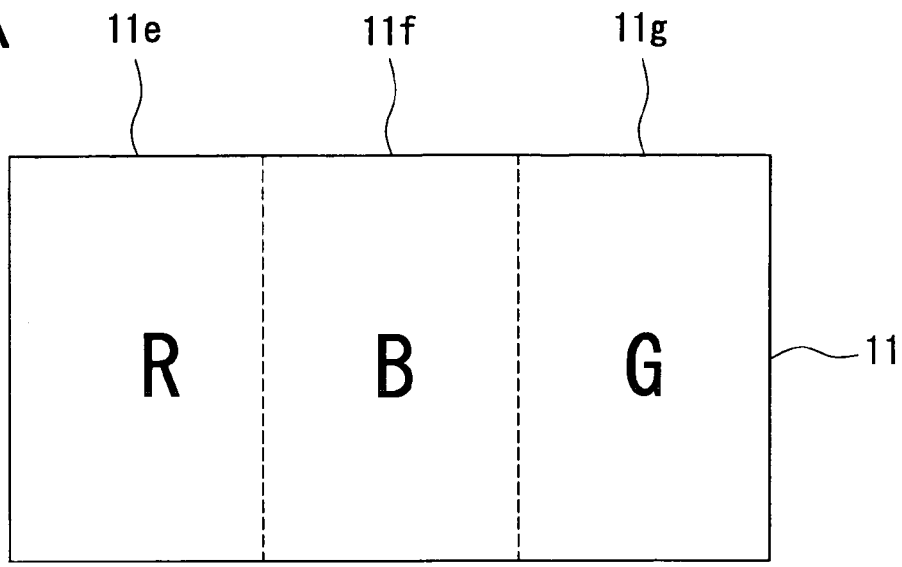
FIGS. 20A to 20C are schematic diagrams showing the time sequence of the backlight device according to the fourth embodiment of the present invention.
Figure 20B:
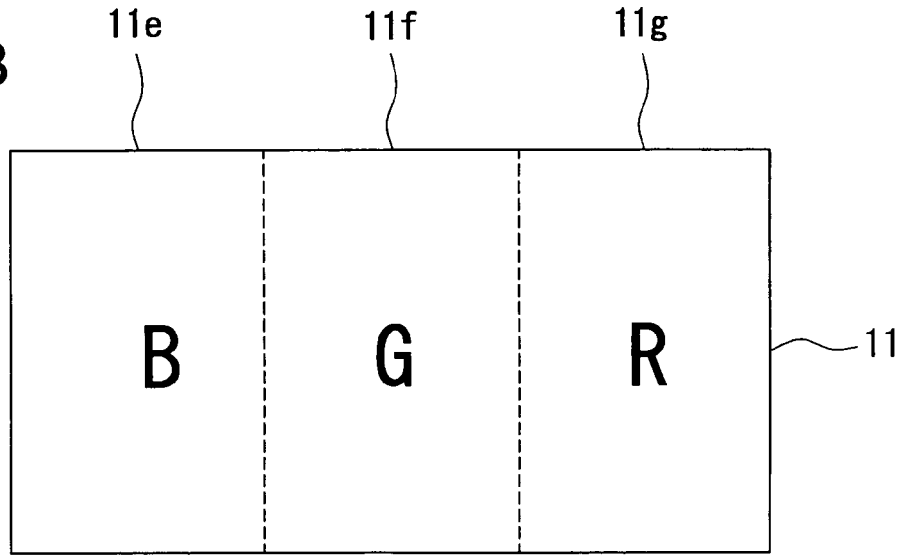
Figure 20C:
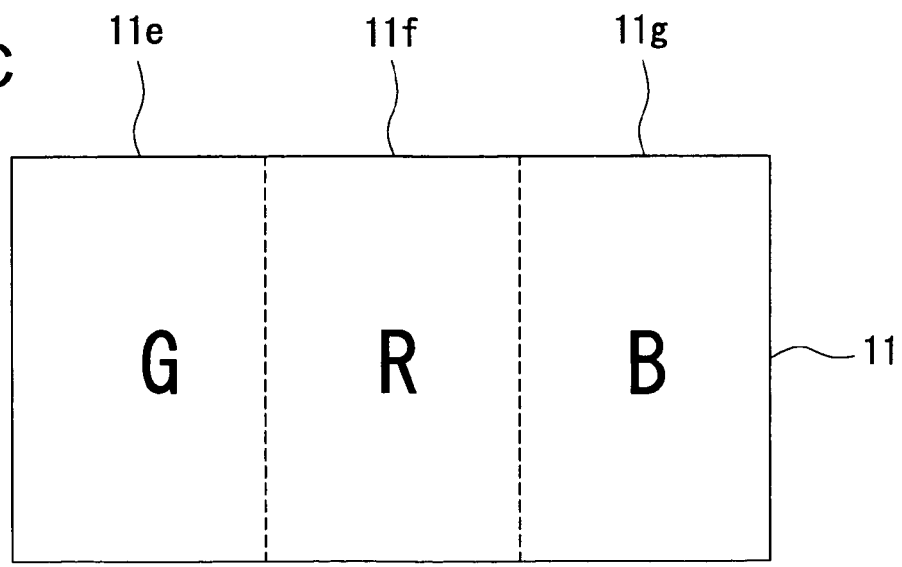

Further referring to FIGS. 20A to 20C, the light guide plate 11 is rectangular in shape. Three segmented regions 11e, 11f, and 11g, to each of which one of the three mercury-free fluorescent lamps 14R to 14B corresponds, are provided in this order in the direction along the longer sides of the rectangle. In other words, the segmented regions 11e to 11g are arranged in the direction along the longer sides of the light guide plate 11.

The three rotary members 12A to 12C respectively correspond to the respective three segmented regions 11e to 11g of the light guide plate 11. Specifically, the rotary member 12A is disposed facing the segmented region 11e, the rotary member 12B is disposed facing the segmented region 11f, and the rotary member 12C is disposed facing the segmented region 11g. The controller (see FIG. 1) synchronizes the rotation of the three rotary members 12A to 12C. For example, in a first period, the red mercury-free fluorescent lamp 14R on the rotary member 12A, the blue mercury-free fluorescent lamp 14B on the rotary member 12B, and the green mercury-free fluorescent lamp 14G on the rotary member 12C are respectively are opposite to the light guide plate 11 so that the red light L(R) emitted from the red mercury-free fluorescent lamp 14R emerges from the segmented region 11e, the blue light L(B) emitted from the blue mercury-free fluorescent lamp 14B emerges from the segmented region 11f, and the green light L(G) emitted from the green mercury-free fluorescent lamp 14G emerges from the segmented region 11g.

FIGS. 20A to 20C are diagrams for explaining the time sequence of the backlight device according to the fourth embodiment. FIGS. 20A to 20C show the colors of the lights emerging from the respective segmented-regions 11e to 11f of the rectangular light guide plate 11, as viewed from the front side (the side facing the liquid crystal display panel 3), in the first, second, and third periods. In the first period shown in FIG. 20A, the red light L(R) emerges from the segmented region 11e of the light guide plate 11, the blue light L(B) emerges from the segmented region 11f, and the green light L(G) emerges from the segmented region 11g. Then, in the second period shown in FIG. 20B, the blue light L(B) emerges from the segmented region 11e of the light guide plate 11, the green light L(G) emerges from the segmented region 11f, and the red light L(R) emerges from the segmented region 11g. Further, in the third period shown in FIG. 20C, the green light L(G) emerges from the segmented region 11e of the light guide plate 11, the red light L(R) emerges from the segmented region 11f, and the blue light L(B) emerges from the segmented region 11g. By controlling the rotation of the rotary members 12A to 12C with the first to third periods as one cycle, it is possible to apply the backlight device to a field sequential display apparatus. It is also possible to prevent the phenomenon generally known as color breaking in which the colors do not overlay but appear as separate images as the field of view is avoided. Furthermore, since the entire area of a large area liquid crystal display panel 3 can be illuminated, the visibility of the liquid crystal display panel 3 improves.

In other respects, the construction and operation of the fourth embodiment are the same as those of the first embodiment, and the same component elements are therefore designated by the same reference numerals and will not be further described here.

Fifth Embodiment

FIG. 21 shows a liquid crystal display apparatus 2 provided with a backlight device 1 according to a fifth embodiment of the present invention. The single rotary member 12 disposed facing the light incident face 11a, an edge face of the light guide plate 11, is provided with four recessed portions 12a, 12b, 12c, and 12d, and has a shape similar to a symbol of plus when viewed in the extending direction of the rotary shaft 23. Four mercury-free fluorescent lamps 14R, 14G, 14B, and 14W respectively emitting light of red, green, blue, and white colors are mounted on the respective recessed portions 12a to 12c.

Figure 22A:
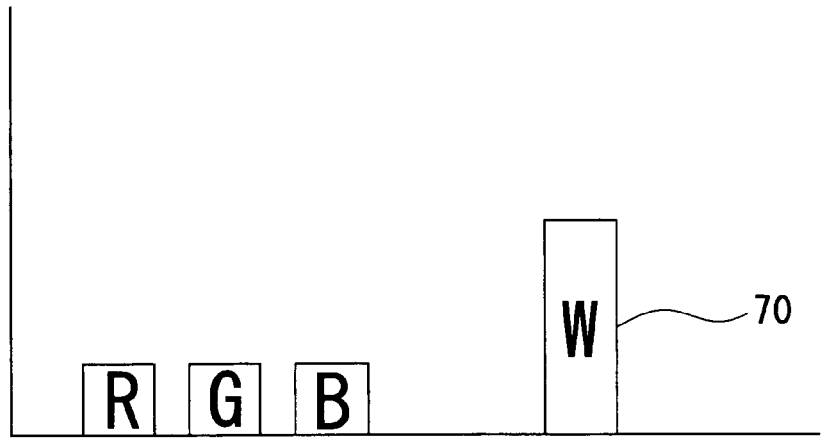
FIGS. 22A to 22C are simplified histograms for explaining how brightness is adjusted.
Figure 22B:
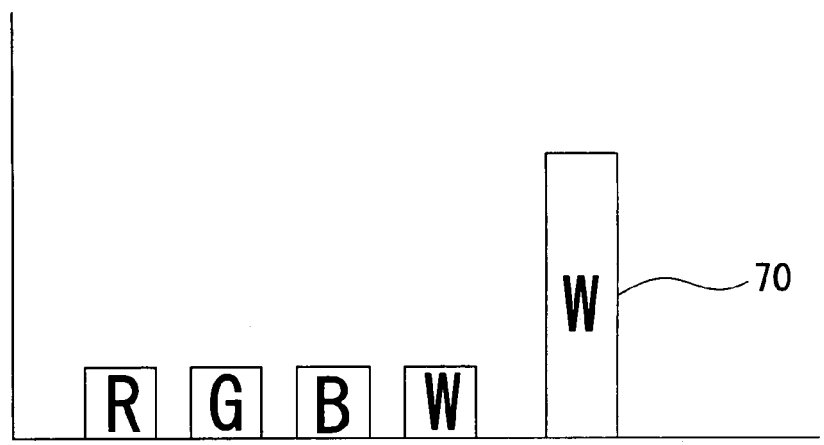
Figure 22C:
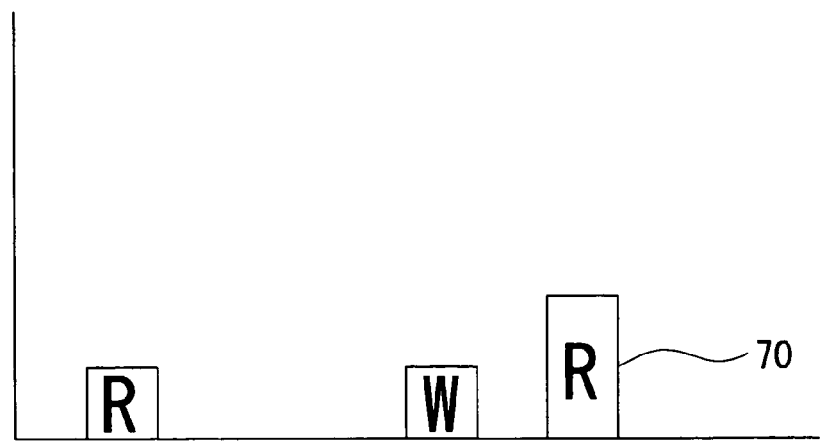

Using the white mercury-free fluorescent lamp 14 in addition to the red, green, and blue mercury-free fluorescent lamps 14R to 14B provides greater freedom in light intensity adjustment. Referring to FIG. 22A, when the red, green, and blue mercury-free fluorescent lamps 14R to 14B are turned on in the same period, the resulting light is perceived as white light by the human eye (see reference numeral 70 in FIG. 22A). The intensity of this white light is approximately equal to the sum of the intensity of the red, green, and blue lights. Referring to FIG. 22B, when the white mercury-free fluorescent lamp 14 is turned on in addition to the red, green, and blue mercury-free fluorescent lamps 14R to 14B in the same period, the perceived intensity of the white light increases by an amount equal to the intensity of the light emitted from the mercury-free fluorescent lamp 14W. Accordingly, the perceived intensity of the white light can be adjusted by turning on or not turning on the white mercury-free fluorescent lamp 14W in the same period. Further, as shown in FIG. 22C, when the red mercury-free fluorescent lamp 14R and the white mercury-free fluorescent lamp 14W are turned on in the same period, the perceived intensity of the red color increases. In other respects, the construction and operation of the fifth embodiment are the same as those of the first embodiment, and the same component elements are therefore designated by the same reference numerals and will not be further described here.

Sixth Embodiment

Figure 23:
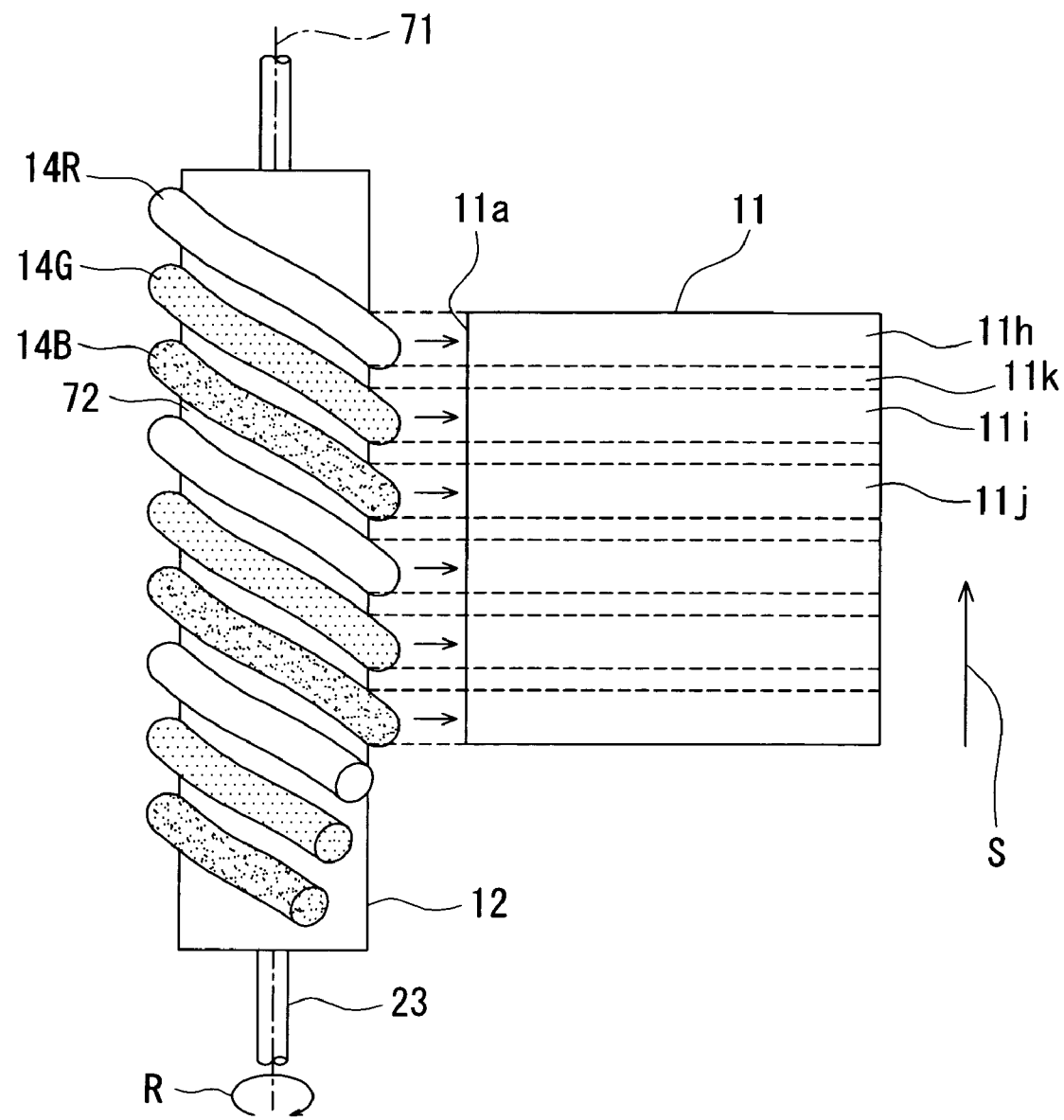
FIG. 23 is a plan view showing a liquid crystal display apparatus provided with a backlight device according to a sixth embodiment of the present invention.

FIG. 23 is a plan view showing a backlight device 1 according to a sixth embodiment of the present invention.

Three mercury-free fluorescent lamps 14R to 14B respectively corresponding to red, green, and blue colors are mounted on the outer peripheral surface of a cylindrically shaped rotary member 12 disposed facing the edge face 11a of the light guide plate 11. The mercury-free fluorescent lamps 14R to 14B are each mounted in a spiral around the rotary member 12. The axis 71 of the spiral formed by the mercury-free fluorescent lamps 14R to 14B is coaxial with the rotary shaft 23. A light separating portion 72 is formed between the respective mercury-free fluorescent lamps 14R to 14B.

Red light L(R) emerges from a segmented region. 11h corresponding to the red mercury-free fluorescent lamp 14, green light L(G) emerges from a segmented region 11i corresponding to the green mercury-free fluorescent lamp 14, and blue light L(B) emerges from a segmented region 11j corresponding to the blue mercury-free fluorescent lamp 14. Further, a dark portion 11k is formed corresponding to the light separating portion 72. Since the segmented regions 11h to 11j move in scrolling fashion with the rotation of the rotary member 12 as indicated by an arrow S, the backlight device can be applied to a field sequential display apparatus. According to the present embodiment, the color breaking problem can be alleviated, and the color breaking phenomenon can be greatly reduced.

The present invention has been perfectly described with reference to the accompanying drawings, however, it is obvious to those skilled in the art that various alterations and modifications are possible. Therefore, it should be construed that such alterations and such modifications are also included in the present invention, in so far as they are not beyond the spirit and the scope of the present invention.

What is claimed is:

1. A backlight device comprising:
   a light guide plate having a light incident face and a light emission face;
   a rotary member adapted to be rotated along a rotary shaft thereof and disposed opposite to the light incident face of the light guide plate;
   a rotary drive mechanism for rotating the rotary member;
   a plurality of mercury-free fluorescent lamps, each comprising an arc tube mounted on the rotary member so as to extend substantially parallel to the rotary shaft, a mercury-free discharge medium consisting essentially of a rare gas sealed within the arc tube, and first and second electrodes for exciting the discharge medium, the mercury-free fluorescent lamps being capable of emitting light of respectively different colors, and the emitted light entering the light guide plate through the light incident face and emerging from the light emission face; and a power feed control mechanism for applying a voltage to the first and second electrodes of each of the mercury-free fluorescent lamps, wherein the first electrode is arranged within the arc tube, and wherein the second electrode comprises a plurality of segmented electrodes arranged on an outer surface of the rotary member so as to be spaced apart from each other in an extending direction of the rotary shaft, and contacting with an outer peripheral surface of the arc tube.

2. A backlight device according to claim 1, wherein the rare gas includes at least one kind of gas selected from the group consisting of krypton gas, argon gas, helium gas, and xenon gas.

3. A backlight device according to claim 1, further comprising a power feed circuit for generating the voltage for exciting the discharge medium, wherein the power feed control mechanism comprises:

first and second cylindrical members provided at both ends of the rotary member so as to be coaxial with the rotary shaft;

a plurality of first contacts provided on a side peripheral surface of the first cylindrical member, each of the first contacts being electrically connected to the first electrode of corresponding one of the mercury-free fluorescent lamps;

a second contact provided on a side peripheral surface of the second cylindrical member and electrically connected to the second electrode;

a first terminal having one end being abutted to the side peripheral surface of the first cylindrical member and the other end being electrically connected to the power feed circuit; and a second terminal having one end being abutted to the side peripheral surface of the second cylindrical member and the other end being electrically connected to the power feed circuit, and wherein the first terminal is contacted with at least one of the plurality of first contacts corresponding to a rotational angular position of the first cylindrical member, while the second terminal is held in contact with the second contact irrespective of a rotational angular position of the second cylindrical member, whereby the voltage is applied to the first and second electrodes of corresponding one of the plurality of mercury-free fluorescent lamps in sequential and intermittent manner to excite the discharge medium.

4. A backlight device according to claim 1, further comprising a reflection member disposed on the opposite side of the light incident face with respect to the rotary member and being capable of reflecting the light emitted from each of the mercury-free fluorescent lamps toward the light incident face.

5. A backlight device according to claim 1, wherein the light guide plate has a pair of the light incident faces opposite to each other, and wherein the rotary member mounted with the mercury-free fluorescent lamps is disposed opposing to each of the light incident faces.

6. A backlight device according to claim 1, wherein the light incident face of the light guide plate is disposed opposite to the light emission face, and wherein the backlight device comprises a plurality of the rotary members each mounted with the mercury-free fluorescent lamps, the plurality of the rotary members being disposed opposite to the light incident face and parallel to each other.

7. A backlight device according to claim 1, wherein the arc tube of the mercury-free fluorescent lamp has a straight tube shape extending in parallel to the rotary shaft.

8. A backlight device according to claim 1, wherein the arc tube of the mercury-free fluorescent lamp has a spiral shape, and a center axis of the spiral shape extends in parallel to the rotary shaft.

9. A liquid crystal display apparatus comprising:

a liquid crystal display panel; and a backlight device mounted facing a rear surface of the liquid crystal display panel, wherein the backlight device comprises:

a light guide plate having a light incident face and a light emission face opposite to the rear surface of the liquid crystal display panel;

a rotary member adapted to be rotated along a rotary shaft thereof and disposed opposite to the light incident face of the light guide plate;

a rotary drive mechanism for rotating the rotary member;

a plurality of mercury-free fluorescent lamps, each comprising an arc tube mounted on the rotary member so as to extend substantially parallel to the rotary shaft, a mercury-free discharge medium consisting essentially of a rare gas sealed within the arc tube, and first and second electrodes for exciting the discharge medium, the mercury-free fluorescent lamps being capable of emitting light of respectively different colors, and the emitted light entering the light guide plate through the light incident face and emerging from the light emission face; and a power feed control mechanism for applying a voltage to the first and second electrodes of each of the mercury-free fluorescent lamps, wherein the first electrode is arranged within the arc tube, and wherein the second electrode comprises a plurality of segmented electrodes arranged on an outer surface of the rotary member along an extending direction of the rotary shaft, and contacting with an outer peripheral surface of the arc tube.

10. A liquid crystal display apparatus according to claim 9, wherein the rare gas includes at least one kind of gas selected from the group consisting of krypton gas, argon gas, helium gas, and xenon gas.

11. A liquid crystal display apparatus according to claim 9, further comprising a power feed circuit for generating the voltage for exciting the discharge medium, wherein the power feed control mechanism comprises:

first and second cylindrical members provided at both ends of the rotary member so as to be coaxial with the rotary shaft;

a plurality of first contacts provided on a side peripheral surface of the first cylindrical member, each of the first contacts being electrically connected to the first electrode of corresponding one of the mercury-free fluorescent lamps;

a second contact provided on a side peripheral surface of the second cylindrical member and electrically connected to the second electrode;

a first terminal having one end being abutted to the side peripheral surface of the first cylindrical member and the other end being electrically connected to the power feed circuit; and a second terminal having one end being abutted to the side peripheral surface of the second cylindrical member and the other end being electrically connected to the power feed circuit, and wherein the first terminal is contacted with at least one of the plurality of first contacts corresponding to a rotational angular position of the first cylindrical member, while the second terminal is held in contact with the second contact irrespective of a rotational angular position of the second cylindrical member, whereby the voltage is applied to the first and second electrodes of corresponding one of the plurality of mercury-free fluorescent lamps in sequential and intermittent manner to excite the discharge medium.

12. A liquid crystal display apparatus according to claim 9, further comprising a reflection member disposed on the opposite side of the light incident face with respect to the rotary member and being capable of reflecting the light emitted from each of the mercury-free fluorescent lamps toward the light incident face.

13. A liquid crystal display apparatus according to claim 9, wherein the light guide plate has a pair of the light incident faces opposite to each other, and wherein the rotary member mounted with the mercury-free fluorescent lamps is disposed opposing to each of the light incident faces.

14. A liquid crystal display apparatus according to claim 9, wherein the light incident face of the light guide plate is disposed opposite to the light emission face, and wherein the backlight device comprises a plurality of the rotary members each mounted with the mercury-free fluorescent lamps, the plurality of the rotary members being disposed opposite to the light incident face and parallel to each other.

15. A liquid crystal display apparatus according to claim 9, wherein the arc tube of the mercury-free fluorescent lamp has a straight tube shape extending in parallel to the rotary shaft.

16. A liquid crystal display apparatus according to claim 9, wherein the arc tube of the mercury-free fluorescent lamp has a spiral shape, and a center axis of the spiral shape extends in parallel to the rotary shaft.

\* \* \* \* \*